United States Patent
Lee et al.

(10) Patent No.: US 11,645,011 B2
(45) Date of Patent: May 9, 2023

(54) STORAGE CONTROLLER, COMPUTATIONAL STORAGE DEVICE, AND OPERATIONAL METHOD OF COMPUTATIONAL STORAGE DEVICE

(71) Applicant: SAMSUNG ELECTRONICS CO., LTD., Suwon-si (KR)

(72) Inventors: Hwang Lee, Seoul (KR); Wan Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/829,980

(22) Filed: Jun. 1, 2022

(65) Prior Publication Data

US 2022/0405015 A1  Dec. 22, 2022

(30) Foreign Application Priority Data

Jun. 17, 2021 (KR) .................. 10-2021-0078889

(51) Int. Cl.
G06F 3/06 (2006.01)

(52) U.S. Cl.
CPC .......... *G06F 3/0659* (2013.01); *G06F 3/0613* (2013.01); *G06F 3/0656* (2013.01); *G06F 3/0658* (2013.01); *G06F 3/0679* (2013.01)

(58) Field of Classification Search
CPC ........ G06F 13/00; G06F 13/10; G06F 13/102; G06F 13/105; G06F 13/12; G06F 13/122;
(Continued)

(56) References Cited

U.S. PATENT DOCUMENTS 9,152,823 B2   10/2015  Shatskih et al.
9,760,503 B2   9/2017   Oh et al.
(Continued)

FOREIGN PATENT DOCUMENTS

JP  2019-75109 A   5/2019
JP  2020-21385 A   2/2020
(Continued)

OTHER PUBLICATIONS

Hardware acceleration, Jan. 16, 2020, Wikipedia, the Internet Archive snapshot dated Jan. 16, 2022, pp. 1-7 http://web.archive.org/web/20200116214237/https://en.wikipedia.org/wiki/Hardware_acceleration (Year: 2020).*

(Continued)

*Primary Examiner* — Reginald G Bragdon
*Assistant Examiner* — Curtis James Kortman
(74) *Attorney, Agent, or Firm* — Sughrue Mion, PLLC

(57) ABSTRACT

A computational storage device includes a non-volatile memory (NVM) device; and a storage controller configured to control the NVM device. The storage controller includes: a computation processor configured to execute an internal application to generate an internal command; a host interface circuit configured to receive a host command from an external host device, to receive the internal command from the computation processor, and to individually process the received host command and the received internal command; a flash translation layer (FTL) configured to perform an address mapping operation based on a result of the processing of the host interface circuit; and a memory interface circuit configured to control the NVM device based on the address mapping operation of the FTL.

20 Claims, 24 Drawing Sheets

(58) Field of Classification Search
CPC .. G06F 13/124; G06F 13/126; G06F 13/1668; G06F 13/1673; G06F 13/1694; G06F 13/36; G06F 13/385; G06F 13/4022; G06F 13/4027; G06F 13/4221; G06F 13/4234; G06F 13/4295; G06F 2213/0008; G06F 2213/0026; G06F 3/0604; G06F 3/0611; G06F 3/0632; G06F 3/0659; G06F 3/0661; G06F 3/067; G06F 3/0679; G06F 3/0688; G06F 9/4411; G06F 2212/7201; G06F 2212/7208

See application file for complete search history.

(56) References Cited

U.S. PATENT DOCUMENTS

| | | | |
|---|---|---|---|
| 10,394,305 | B2 | 8/2019 | Kim |
| 10,394,746 | B2 | 8/2019 | Kachare et al. |
| 10,592,443 | B2 | 3/2020 | Kachare et al. |
| 10,915,381 | B2 | 2/2021 | Costa et al. |
| 10,915,383 | B2 | 2/2021 | Steuer et al. |
| 2012/0284587 | A1* | 11/2012 | Yu ................. G06F 12/0868 711/E12.008 |
| 2018/0129599 | A1 | 5/2018 | Kim |
| 2019/0065362 | A1 | 2/2019 | Shin et al. |
| 2019/0107956 | A1* | 4/2019 | Kachare ............ G06F 13/1668 |
| 2019/0114272 | A1* | 4/2019 | Dubey ............... G06F 12/0246 |
| 2019/0317901 | A1 | 10/2019 | Kachare et al. |
| 2020/0042241 | A1 | 2/2020 | Nakano |
| 2020/0104056 | A1 | 4/2020 | Benisty et al. |
| 2020/0133898 | A1* | 4/2020 | Therene ............... G06F 3/0679 |
| 2020/0225874 | A1 | 7/2020 | Nimmagadda et al. |
| 2020/0356305 | A1 | 11/2020 | Kim et al. |
| 2021/0109673 | A1* | 4/2021 | Kim .................... G06F 3/0653 |
| 2021/0165604 | A1 | 6/2021 | Kim et al. |

FOREIGN PATENT DOCUMENTS

| | | |
|---|---|---|
| KR | 10-0966236 B1 | 6/2010 |
| KR | 10-2018-0050888 A | 5/2018 |
| KR | 10-2019-0023196 A | 3/2019 |
| KR | 10-2020-0037049 A | 4/2020 |
| KR | 10-2020-0087052 A | 7/2020 |
| KR | 10-2020-0129843 A | 11/2020 |
| KR | 10-2021-0068699 A | 6/2021 |

OTHER PUBLICATIONS

J Metz, Let's Talk "Fabrics", Jun. 27, 2018, Storage Networking Industry Association (SNIA), slides 1-49 https://www.snia.org/educational-library/lets-talk-fabrics-nvme-over-fabrics-2018 (Year: 2018).*

Communication dated Aug. 27, 2021 issued by the Korean Intellectual Property Office in counterpart Korean Application No. 10-2021-0078889.

Communication dated Nov. 17, 2021 issued by the Korean Intellectual Property Office in counterpart Korean Application No. 10-2021-0078889.

* cited by examiner

STORAGE CONTROLLER, COMPUTATIONAL STORAGE DEVICE, AND OPERATIONAL METHOD OF COMPUTATIONAL STORAGE DEVICE

CROSS-REFERENCE TO RELATED APPLICATION

This application claims priority under 35 U.S.C. § 119 to Korean Patent Application No. 10-2021-0078889 filed on Jun. 17, 2021, in the Korean Intellectual Property Office, the disclosure of which is incorporated by reference herein in its entirety.

BACKGROUND

Embodiments of the present disclosure relate to a semiconductor memory, and more particularly, to a storage controller, a computational storage device, and an operational method of the computational storage device.

A semiconductor memory device is classified as a volatile memory device, in which stored data disappear when a power supply is turned off, such as a static random access memory (SRAM) or a dynamic random access memory (DRAM), or a non-volatile memory (NVM) device, in which stored data are retained even when a power supply is turned off, such as a flash memory device, a phase-change RAM (PRAM), a magnetic RAM (MRAM), a resistive RAM (RRAM), or a ferroelectric RAM (FRAM).

A flash memory-based storage device is used as a high-capacity storage medium of a computing system. A typical storage device has a function of storing data under control of a host device. Nowadays, to reduce the burden of computation of the host device, storage devices supporting various computations or various applications therein are being developed.

SUMMARY

One or more embodiments provide a storage controller and a computational storage device with reduced costs and improved performance and, an operational method of the computational storage device.

According to an embodiment, a computational storage device includes a non-volatile memory device, and a storage controller that controls the non-volatile memory device. The storage controller includes a computation engine that executes an internal application to generate an internal command, a host interface block that receives a host command from an external host device, receives the internal command from the computation engine, and individually processes the received host command and the received internal command, a flash translation layer that performs an address mapping operation based on a result of the processing of the host interface block, and a memory interface block that controls the non-volatile memory device based on the address mapping operation of the flash translation layer.

According to an embodiment, an operational method of a computational storage device includes receiving, by a physical port, a host command from an external host device, processing the host command through an NVM express (NVMe) engine, performing, by a flash translation layer, first address mapping for the processed host command, accessing, by a memory interface block, a non-volatile memory device based on the first address mapping, generating, by a computation engine executing an internal application, an internal command, processing the internal command through the NVMe engine, performing, by the flash translation layer, second address mapping for the processed internal command, and accessing, by the memory interface block, the non-volatile memory device based on the second address mapping.

According to an embodiment, a storage controller which is configured to control a non-volatile memory device includes an NVMe engine that receives a host command through an external host driver, a flash translation layer (FTL) that performs address mapping under control of the NVMe engine, a memory interface block that accesses the non-volatile memory device based on the address mapping of the FTL, an internal application that issues an internal input/output (I/O), an internal file system that organizes the internal I/O, and an internal driver that generates an internal command based on the organized internal I/O. The NVMe engine receives the internal command from the internal driver, and accesses the non-volatile memory device through the FTL and the memory interface block based on the received internal command.

According to an embodiment, a computational storage device includes a non-volatile memory device, a computation controller that generates an internal command by executing an internal application, and a storage controller that receives the internal command from the computation controller, accesses the non-volatile memory device in response to the received internal command, receives a host command from an external host device, and accesses the non-volatile memory device in response to the received host command, and the storage controller includes a host interface block configured to receive both the internal command and the host command.

BRIEF DESCRIPTION OF DRAWINGS

The above and other aspects and features will become more apparent by describing in certain embodiments with reference to the accompanying drawings, in which.

DETAILED DESCRIPTION

Below, certain embodiments are described in detail and clearly to such an extent that an ordinary one in the art easily implements the invention.

Figure 1:
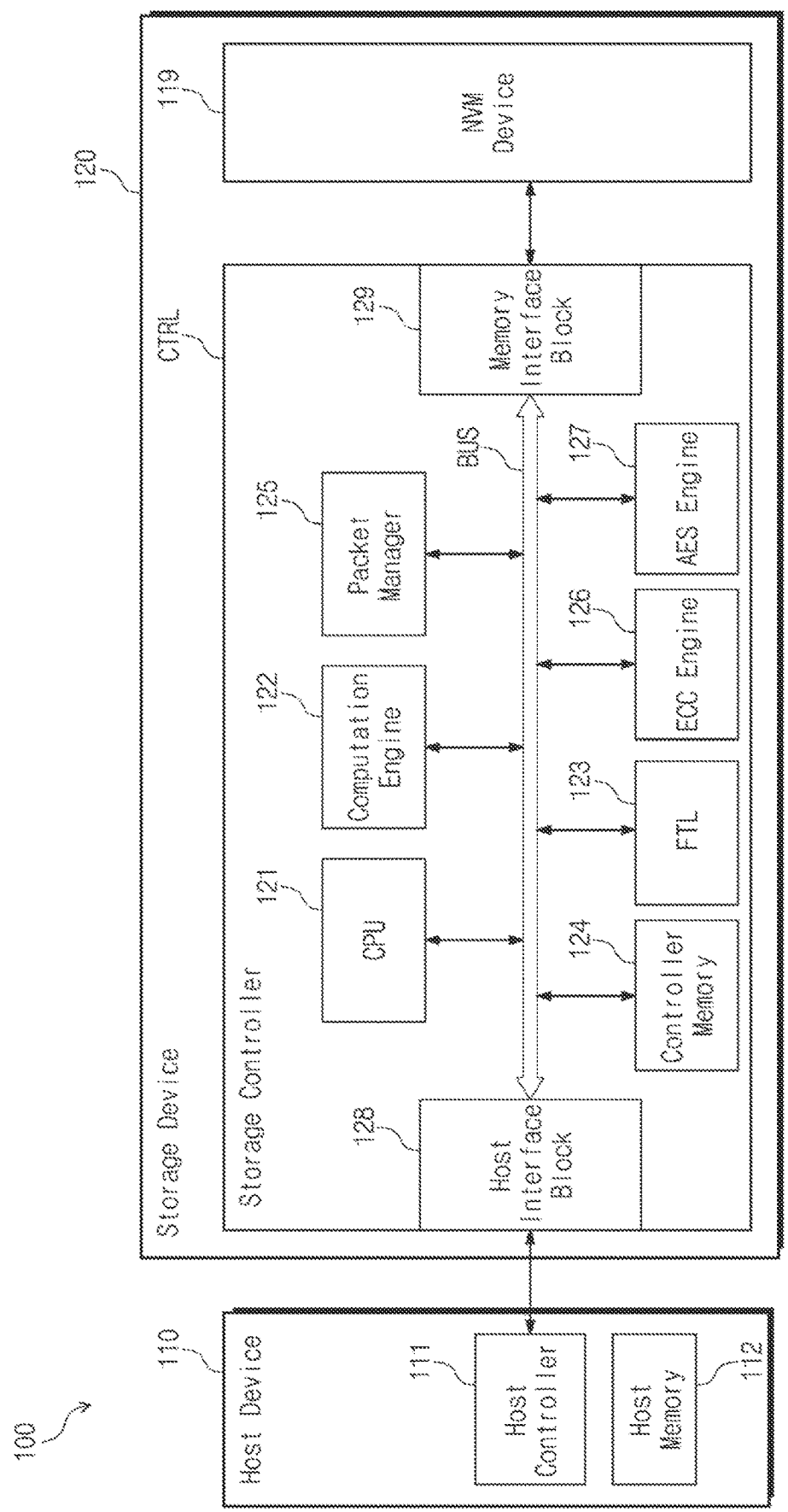
FIG. 1 is a block diagram illustrating a storage system, according to an embodiment.

FIG. 1 is a block diagram illustrating a storage system, according to an embodiment. Referring to FIG. 1, a storage system 100 may include a host device 110 and a storage device 120. In one or more embodiments, the storage device 120 may be a computational storage device, as described in detail below.

In an embodiment, the storage system 100 may be a mobile system such as a mobile phone, a smartphone, a tablet personal computer (PC), a wearable device, a health care device, or an Internet of Things (IoT) device. In an embodiment, the storage system 100 may be a computing device such as a personal computer, a laptop computer, a server, a media player or a system such as an automotive device including a navigation system.

In an embodiment, the storage device 120 may be a computational storage device configured to perform various computations in addition to a common function (e.g., a function of storing and outputting data) of a related art storage device. Below, for convenience of description, the terms "storage device" and "computational storage device" are used interchangeably.

The host device 110 may store data in the storage device 120 or may read data stored in the storage device 120. The host device 110 may include a host controller 111 and a host memory 112. The host controller 111 may be configured to control the storage device 120. In an embodiment, the host controller 111 may communicate with the storage device 120 through an interface. The interface may be an interface complying with the NVMe standard, but an embodiment is not limited thereto.

The host memory 112 may be a buffer memory, a working memory, or a system memory of the host device 110. For example, the host memory 112 may be configured to store a variety of information for the host device 110 to operate. The host memory 112 may be used as a buffer memory for temporarily storing data to be sent to the storage device 120 or data received from the storage device 120. In an embodiment, the host memory 112 may support an access by the storage device 120.

In an embodiment, the host controller 111 and the host memory 112 may be implemented as separate semiconductor chips. Alternatively, in an embodiment, the host controller 111 and the host memory 112 may be integrated in a single semiconductor chip or may be implemented as a multi-chip package. For example, the host controller 111 may be one of a plurality of modules that an application processor includes. The application processor may be implemented as a system on chip (SoC). The host memory 112 may be an embedded memory included in the application processor, or may be an NVM device, a volatile memory device, a non-volatile memory module, or a volatile memory module disposed outside the application processor.

The storage device 120 may be a storage medium configured to store data or to output the stored data, depending on a request of the host device 110. In an embodiment, the storage device 120 may include at least one of a solid state drive (SSD), an embedded memory, and a removable external memory. In the case where the storage device 120 is an SSD, the storage device 120 may be a device complying with the NVMe standard. In the case where the storage device 120 is an embedded memory or an external memory, the storage device 120 may be a device complying with the Universal Flash Storage (UFS) or Embedded Multi-Media Card (eMMC) standard. Each of the host device 110 and the storage device 120 may generate a packet complying with a standard protocol applied thereto and may send the generated packet.

The storage device 120 may include a storage controller CTRL and an NVM device 119. The storage controller CTRL may include a central processing unit (CPU) 121, a computation engine 122, e.g., a computation processor, an FTL 123, a controller memory 124, a packet manager 125, an error correction code (ECC) engine 126, e.g., an error correction processor, an advanced encryption standard (AES) engine 127, e.g., an AES processor, a host interface block 128, e.g., a host interface circuit, a memory interface block 129, e.g., a memory interface circuit, and a system bus. In an embodiment, each of various components included in the storage controller CTRL may be implemented as an intellectual property (IP) block or a function block, and may be implemented as software, hardware, firmware, or a combination thereof.

The CPU 121 may control overall operations of the storage controller CTRL. For example, the CPU 121 may be configured to drive a variety of firmware or software running on the storage controller CTRL.

The computation engine 122 may be configured to perform various computations to be processed on the storage controller CTRL or to drive an application or computation program running on the storage controller CTRL. In an embodiment, the computation engine 122 may be configured to perform a part of a function(s) of a host application that is driven on the host device 110. In an embodiment, an internal application may be configured to perform various data processing operations such as an encryption operation, a filtering operation, and a convolution operation for machine learning In an embodiment, the CPU 121 and the computation engine 122 are illustrated as being separate function blocks, but an embodiment is not limited thereto. For example, each of the CPU 121 and the computation engine 122 may be implemented as an independent processor core. Alternatively, the CPU 121 and the computation engine 122 may be implemented as one processor core or may be implemented as a multi-core processor including a plurality of processor cores.

The FTL 123 may perform various maintenance operations for efficiently using the NVM device 119. For example, the maintenance operations may include an address mapping operation, a wear-leveling operation, a garbage collection operation, etc.

The address mapping operation may refer to an operation of making translation or mapping between a logical address managed by the host device 110 and a physical address of the NVM device 119.

The wear-leveling operation may refer to an operation of making uniform a frequency at which a plurality of memory blocks included in the NVM device 119 are used or the number of times that the plurality of memory blocks are used, and may be implemented through a firmware technology for balancing erase counts of physical blocks or through hardware. In an embodiment, as each of the plurality of memory blocks of the NVM device 119 is uniformly used through the wear-leveling operation, a specific memory block may be prevented from being excessively degraded, and thus, a lifetime of the NVM device 119 may be improved.

The garbage collection operation may refer to an operation of securing an available memory block or a free memory block by copying valid data of a source memory block of the NVM device 119 to a target memory block thereof and then erasing the source memory block.

In an embodiment, the FTL 123 may be implemented as software or firmware and may be stored in the controller memory 124 or in a separate working memory. The CPU 121 may perform the maintenance operations described above, by driving the FTL 123 stored in the controller memory 124 or the separate working memory. In an embodiment, the FTL 123 may be implemented through various hardware automation circuits configured to perform the maintenance operations described above. That is, the FTL 123 may be implemented as hardware, and the maintenance operations described above may be performed through the hardware.

The controller memory 124 may be used as a buffer memory or a working memory of the storage controller CTRL. For example, the controller memory 124 may temporarily store data received from the host device 110 or the NVM device 119. Alternatively, the controller memory 124 may be configured to store a variety of information or a program code for the storage controller CTRL to operate. The CPU 121 may perform various operations based on the information or the program code stored in the controller memory 124.

In an embodiment, the controller memory 124 may be configured to store data used by the computation engine 122 or to store a program code for an application driven by the computation engine 122. The computation engine 122 may execute the program code stored in the controller memory 124 or may perform various computations (or operations) on data stored in the controller memory 124.

In an example illustrated in FIG. 1, the controller memory 124 is included in the storage controller CTRL, but an embodiment is not limited thereto. The controller memory 124 may be a separate memory module or memory device located outside the storage controller CTRL. The storage controller CTRL may further include a memory controller configured to control the memory module or memory device located on the outside.

The packet manager 125 may be configured to parse a packet received from the host device 110 or to generate a packet for data to be sent to the host device 110. In an embodiment, the packet may be generated based on an interface protocol between the host device 110 and the storage device 120.

The ECC engine 126 may perform an error detection and correction function on data read from the NVM device 119. For example, the ECC engine 126 may generate parity bits with respect to data to be written to the NVM device 119. The parity bits thus generated may be stored in the NVM device 119 together with the write data. Afterwards, in reading data from the NVM device 119, the ECC engine 126 may correct an error of the read data by using the read data and the corresponding parity bits and may output the error-corrected read data.

The AES engine 127 may perform at least one of an encryption operation and a decryption operation on data input to the storage controller CTRL by using a symmetric-key algorithm.

The storage controller CTRL may communicate with the host device 110 through the host interface block 128. Below, to describe embodiments, it is assumed that the host interface block 128 supports an interface complying with the NVMe standard. However, an embodiment is not limited thereto. For example, the host interface block 128 may be configured to support at least one of various interfaces such as an Advanced Technology Attachment (ATA) interface, a Serial ATA (SATA) interface, an external SATA (e-SATA) interface, a Small Computer Small Interface (SCSI), a Serial Attached SCSI (SAS) interface, a Peripheral Component Interconnection (PCI) interface, a PCI express (PCIe) interface, an IEEE 1394 interface, a Universal Serial Bus (USB) interface, a Secure Digital (SD) card interface, an MMC interface, an eMMC interface, a UFS interface, an embedded UFS (eUFS) interface, and a Compact Flash (CF) card interface.

The storage controller CTRL may communicate with the NVM device 119 through the memory interface block 129. In an embodiment, the memory interface block 129 may be configured to support a flash interface such as a Toggle interface or an open NAND flash interface (ONFI). However, an embodiment is not limited thereto.

Various components included in the storage controller CTRL may communicate with each other through the system bus BUS. The system bus BUS may include various system buses such as an Advanced System Bus (ASB), an Advanced Peripheral Bus (APB), an Advanced High Performance Bus (AHB), and an Advanced eXtensible Interface (AXI) bus.

Under control of the storage controller CTRL, the NVM device 119 may be configured to store data, to output the stored data, or to erase the stored data. In an embodiment, the NVM device 119 may be a two-dimensional (2D) or three-dimensional (3D) NAND flash memory device, but an embodiment is not limited thereto. For example, the NVM device 119 may be an MRAM, a Spin-Transfer Torque MRAM (SST-MRAM), a Conductive bridging RAM (CBRAM), an FRAM, a PRAM, an RRAM, or a memory device that is based on various kinds of memories different from each other. In an embodiment, the NVM device 119 may include a plurality of non-volatile memories, each of which is implemented as an independent chip or an independent package. The storage controller CTRL may communicate with the plurality of non-volatile memories of the NVM device 119 through a plurality of channels.

As described above, the storage device 120 according to an embodiment may perform various computations (or operations) by executing various applications by using the computation engine 122 of the storage controller CTRL. In this case, because the burden on computation to be performed by the host device 110 may be alleviated, the overall performance of the storage system 100 may be improved.

Figure 2:
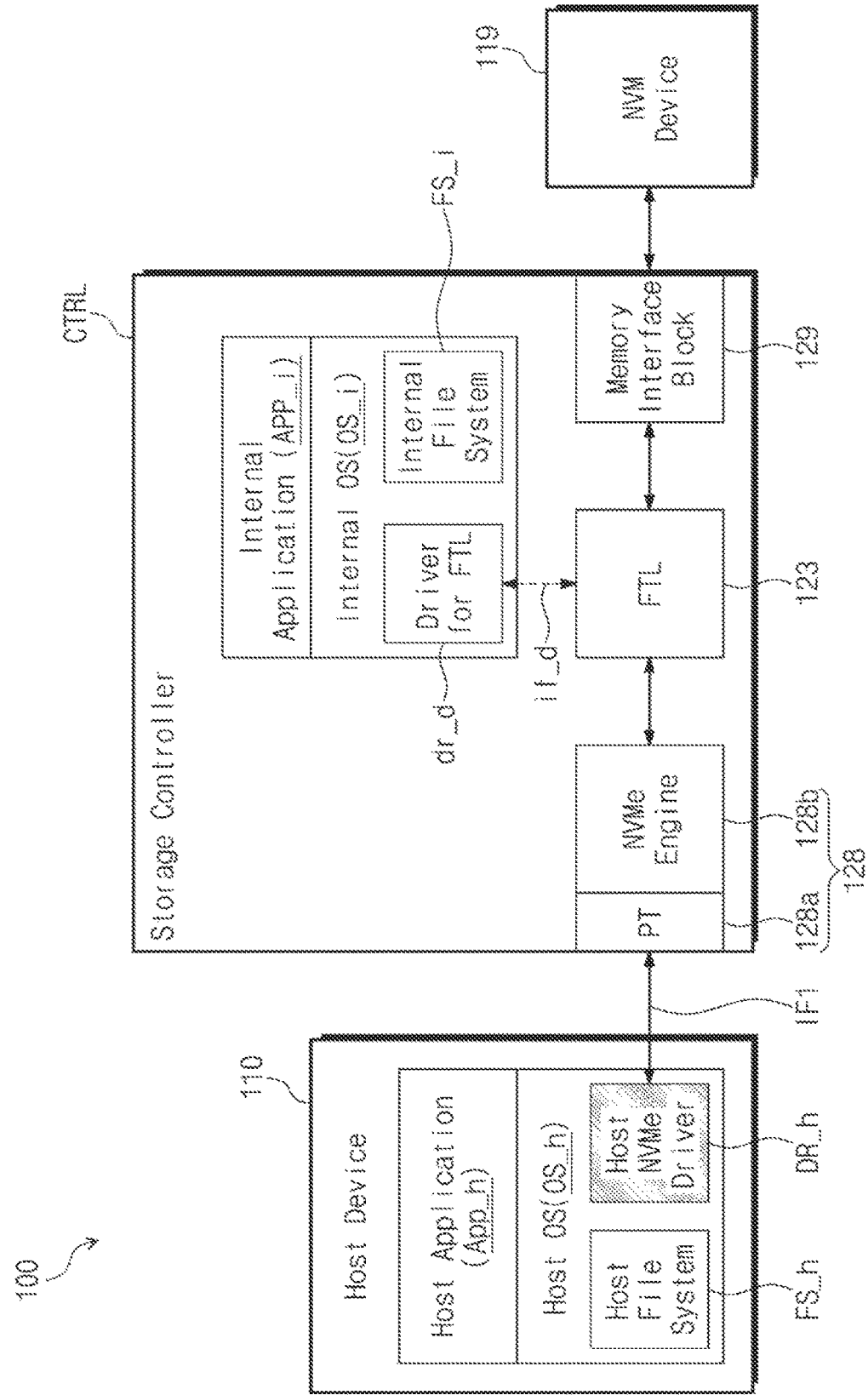
FIG. 2 is a diagram for describing an operation of a storage system, according to an embodiment.

FIG. 2 is a diagram for describing an operation of a storage system. For convenience of description, components that are unnecessary to describe an operation of the storage system 100 will be omitted.

Referring to FIGS. 1 and 2, configurations and operations of the host device 110 and the storage device 120 are described above, and thus, redundant description will be omitted.

In an embodiment, the host device 110 may include a processor, and the processor may drive a host application APP_h. The host application APP_h may refer to a program that is driven on a host operating system OS_h. The host application APP_h may store data in the storage device 120 or may read data stored in the storage device 120. That is, the host application APP_h may issue an I/O request for the storage device 120. Below, an I/O request issued by the host application APP_h of the host device 110 is referred to as a "host I/O".

The host operating system OS_h may include a host file system FS_h and a host NVMe driver DR_h. The host file system FS_h may be configured to manage or organize a storage space of the storage device 120, on the host operating system OS_h. The host NVMe driver DR_h may send the host I/O, which is organized through the host file system FS_h as a host command, to the storage device 120 through a first interface IF1, e.g., a first interface path or a first interface connection. In an embodiment, the host NVMe driver DR_h may be configured to support the NVMe standard and may be controlled or driven by the host controller 111 of FIG. 1. In this case, the first interface IF1 may be an interface that is based on the NVMe standard.

The storage controller CTRL may include the FTL 123, the host interface block 128, and the memory interface block 129. The storage controller CTRL may receive a host command from the host NVMe driver DR_h through the first interface IF1 and may perform an operation corresponding to the received host command.

For example, the host interface block 128 may include a physical port (PT) 128a and an NVMe engine 128b, e.g., NVMe processor. The PT 128a may be a circuit or a physical layer configured to send and receive a physical signal complying with the Peripheral Component Interconnect Express (PCIe) protocol.

The NVMe engine 128b may be configured to process a signal received through the PT 128a or to send a signal to the host NVMe driver DR_h through the PT 128a. In an embodiment, the NVMe engine 128b may be configured to process a signal received through the PT 128a. In an embodiment, the NVMe engine 128b may be an NVMe controller that provides an interface between the host device 110 and the storage device 120 (or an NVM sub-system). In an embodiment, the NVMe engine 128b may be a physical function (PF) block configured to support the NVMe interface.

The FTL 123 may receive a signal from the NVMe engine 128b and may perform various maintenance operations based on the received signal. Operations of the FTL 123 are described above, and thus, redundant description will be omitted. The FTL 123 may read data stored in the NVM device 119 through the memory interface block 129 or may store data in the NVM device 119 through the memory interface block 129.

As described above, the host I/O issued by the host application APP_h of the host device 110 may be processed through the host file system FS_h, the host NVMe driver DR_h, the PT 128a, the NVMe engine 128b, the FTL 123, and the memory interface block 129.

In an embodiment, the storage device 120 may be configured to perform various computations (or operations) by driving an internal application APP_i. For example, the storage controller CTRL of the storage device 120 may drive the internal application APP_i. The internal application APP_i may be driven on an internal operating system or firmware (hereinafter referred to as an "internal operating system") OS_i. The internal application APP_i and the internal operating system OS_i may be driven by the computation engine 122 described with reference to FIG. 1.

In an embodiment, the internal application APP_i and the internal operating system OS_i that are driven by the storage controller CTRL may be different from the host application APP_h and the host operating system OS_h that are driven by the host device 110. For example, the internal application APP_i may be physically or logically distinguishable from the host application APP_h, and the internal operating system OS_i may be physically or logically distinguishable from the host operating system OS_h. Alternatively, the internal application APP_i and the internal operating system OS_i may be driven by an internal component (e.g., the computation engine 122 of the storage controller CTRL) of the storage device 120, and the host application APP_h and the host operating system OS_h may be driven by an internal component (e.g., the processor) of the host device 110.

In an embodiment, the internal application APP_i and the internal operating system OS_i may be components different from programs that are required to perform a storage function of the storage controller CTRL. The storage function of the storage controller CTRL may include functions of storing data, reading data, and managing a storage space of the NVM device 119, in response to a host command from the host device 110. That is, compared to a related art storage device, the storage device 120 according to an embodiment may further include the internal application APP_i and the internal operating system OS_i and thus may additionally perform computation.

As the internal application APP_i is driven, an I/O request may be issued from the internal application APP_i. Below, the I/O request issued by the internal application APP_i is referred to as an "internal I/O". The internal I/O issued by the internal application APP_i may be provided to the FTL 123 through an internal file system FS_i and a dedicated driver dr_d of the internal operating system OS_i. In an embodiment, the internal file system FS_i may be a component that is managed or used by the internal operating system OS_i of the storage controller CTRL and may be a component distinguished from the host file system FS_h of the host device 110.

In an embodiment, the dedicated driver dr_d may communicate with the FTL 123 through a dedicated interface if_d. The dedicated driver dr_d may be a software, firmware, or hardware component separately implemented for the communication with the FTL 123.

In an embodiment, the communication between components in the storage controller CTRL may be implemented through the system bus BUS or an individual communication channel or path. For example, the communication between the NVMe engine 128b and the FTL 123, the communication between the FTL 123 and the memory interface block 129, the communication between the dedicated driver dr_d and the FTL 123 may be implemented through the system bus BUS or may be respectively implemented through independent communication channels.

Figure 3:
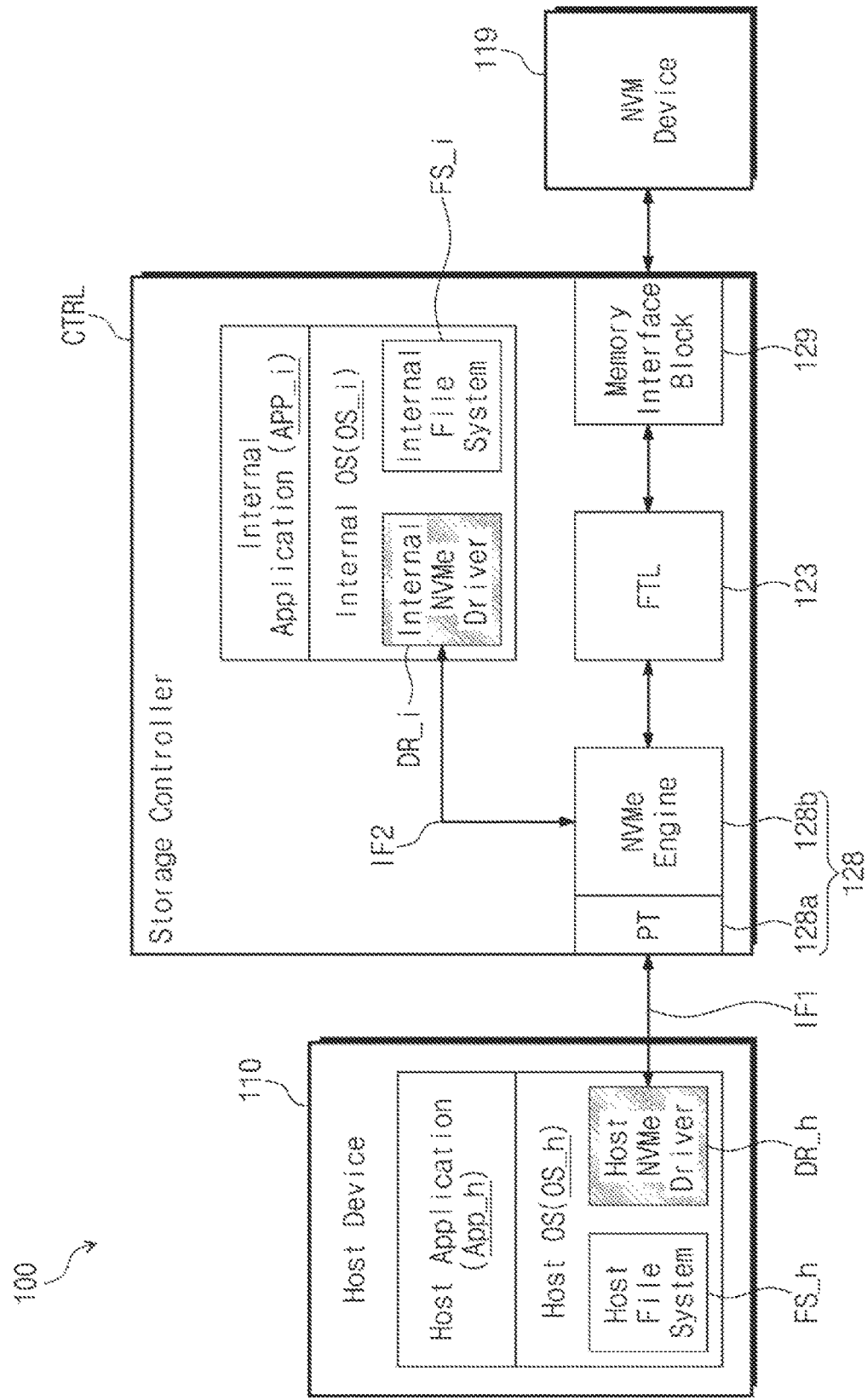
FIG. 3 is a block diagram illustrating a storage system, according to an embodiment.

FIG. 3 is a block diagram illustrating a storage system of FIG. 1. For convenience of description, redundant description associated with the components described above will be omitted. Referring to FIGS. 1 and 3, the host device 110 may drive the host operating system OS_h and the host application APP_h.

In an embodiment, the storage controller CTRL may drive the internal application APP_i on the internal operating system OS_i. The internal application APP_i may be driven on the internal operating system OS_i by the computation engine 122. The internal operating system OS_i may process an internal I/O, which is issued from the internal application APP_i, through the internal file system FS_i and an internal NVMe driver DR_i. The internal NVMe driver DR_i may communicate with the NVMe engine 128*b* through a second interface IF2.

That is, in an embodiment, the internal I/O issued by the internal application APP_i of the storage controller CTRL may be processed through the internal file system FS_i, the internal NVMe driver DR_i, the NVMe engine 128*b*, the FTL 123, and the memory interface block 129.

In the embodiment described with reference to FIG. 3, an I/O issued by the internal application APP_i of the storage controller CTRL may be provided to the NVMe engine 128*b* through the internal NVMe driver DR_i of the internal operating system OS_i. That is, a host I/O from the host application APP_h of the host device 110 and an internal I/O from the internal application APP_i of the storage controller CTRL may be processed through the same NVMe engine 128*b* or may share the same NVMe engine 128*b*. In this case, the burden of implementing or designing components configured to process an internal I/O issued by the internal application APP_i of the storage controller CTRL may be alleviated.

For example, in the embodiment described with reference to FIG. 2, an internal I/O issued by the internal application APP_i of the storage controller CTRL is provided to the FTL 123 through the dedicated driver dr_d of the internal operating system OS_i. In this case, to implement the dedicated driver dr_d configured to directly communicate with the FTL 123 and the direct communication between the FTL 123 and the dedicated driver dr_d increases the burden on design.

In contrast, in an embodiment, the internal NVMe driver DR_i of the storage controller CTRL may communicate with the NVMe engine 128*b* through the second interface IF2. In this case, the internal NVMe driver DR_i may include a software layer or a hardware layer that is substantially similar to the host NVMe driver DR_h. That is, because a structure of the internal NVMe driver DR_i of the storage controller CTRL is similar to those of related art NVMe drivers, there is no additional burden on design. The second interface IF2 may be an interface that is based on the same standard as the first interface IF1 (e.g., based on the NVMe standard or the PCIe standard). That is, there is no need to additionally design a separate interface or a dedicated interface for the communication between a driver of the internal operating system OS_i and the FTL 123. In an embodiment, the second interface IF2 may be an interface that is virtualized through the system bus BUS.

As described above, the storage device 120 according to an embodiment may perform various computations (or operations) through the internal application APP_i. An I/O issued by the internal application APP_i of the storage controller CTRL may be provided to the NVMe engine 128*b* through the internal NVMe driver DR_i of the storage controller CTRL. The NVMe engine 128*b* may be configured to support the communication with the host device 110. That is, an I/O issued by the storage controller CTRL may be processed through the same path as an I/O issued by the host device 110. Accordingly, the burden of designing an internal configuration of the storage controller CTRL may be alleviated.

Figure 4:
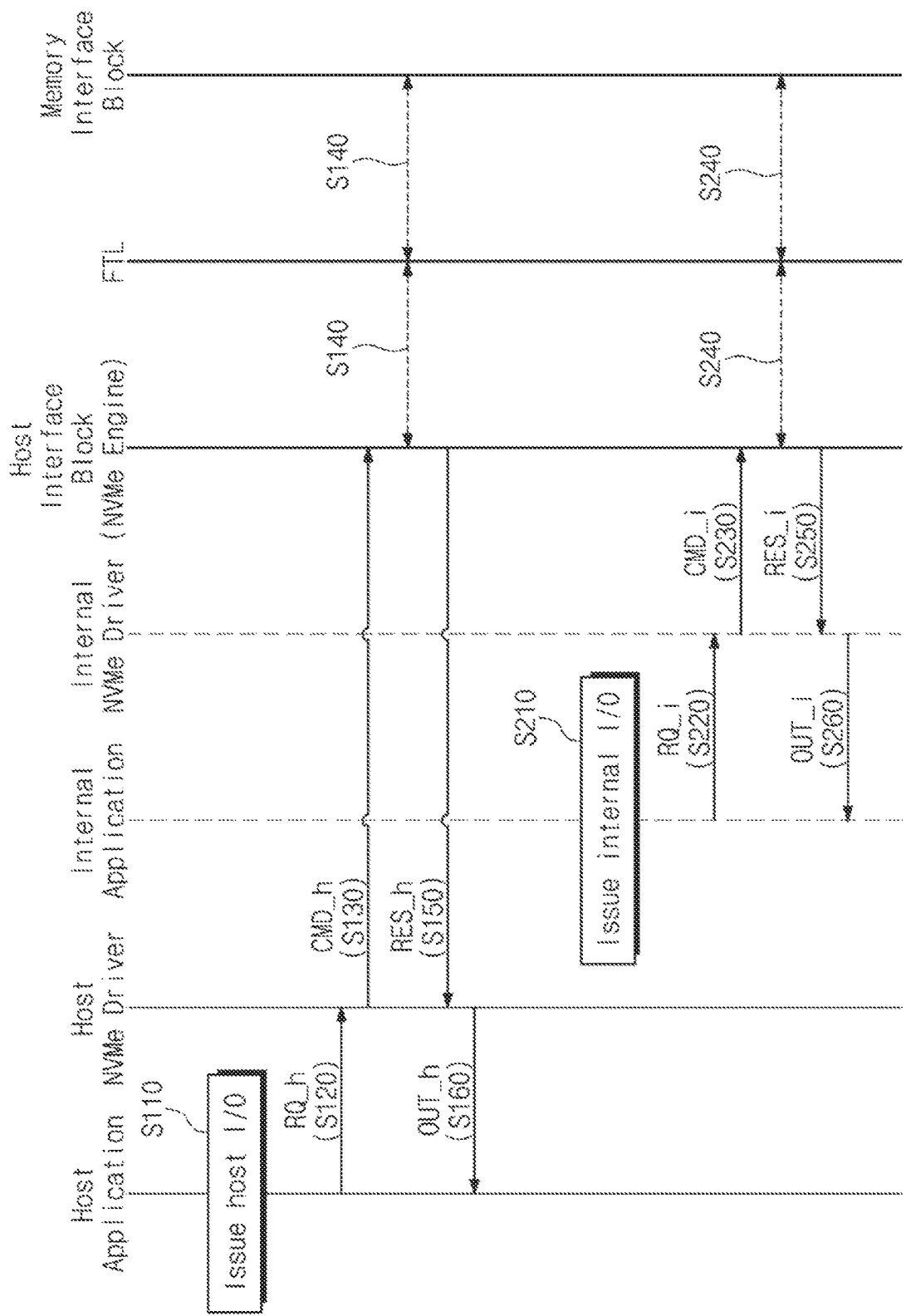
FIG. 4 is a flowchart for describing an operation of a storage system, according to an embodiment.

FIG. 4 is a flowchart for describing an operation of a storage system of FIG. 3. For convenience of description, redundant description associated with the components described above will be omitted. Referring to FIGS. 3 and 4, in operation S110, the host application APP_h may issue a host I/O. For example, the host application APP_h may issue the host I/O for obtaining data to operate from the storage device 120 or storing data in the storage device 120.

In operation S120, a host request RQ_h corresponding to the host I/O may be provided from the host application APP_h to the host NVMe driver DR_h. In an embodiment, the host request RQ_h may be information that is generated by organizing the host I/O at the host file system FS_h of the host operating system OS_h. In operation S130, the host NVMe driver DR_h may send a host command CMD_h corresponding to the host request RQ_h to the host interface block 128 through the first interface IF1 in response to the host request RQ_h.

In operation S140, the host interface block 128, the FTL 123, and the memory interface block 129 may process the host command CMD_h thus received. For example, the host interface block 128, the FTL 123, and the memory interface block 129 may perform an operation corresponding to the host command CMD_h.

In operation S150, the host interface block 128 may provide the host NVMe driver DR_h with a host response RES_h indicating that the host command CMD_h is processed.

In operation S160, the host NVMe driver DR_h may provide a host output OUT_h (e.g., a result associated with the host I/O) to the host application APP_h in response to the host response RES_h.

In operation S210, an internal I/O may be issued by the internal application APP_i of the storage controller CTRL. For example, in the process of performing various computations (or operations), the internal application APP_i may issue the internal I/O for reading data stored in the NVM device 119 or storing data in the NVM device 119.

In operation S220, an internal request RQ_i corresponding to the internal I/O may be provided to the internal NVMe driver DR_i. In an embodiment, the internal request RQ_i may be information that is generated by organizing the internal I/O at the internal file system FS_i of the internal operating system OS_i.

In operation S230, the internal NVMe driver DR_i may send an internal command CMD_i corresponding to the internal request RQ_i to the host interface block 128 through the second interface IF2 in response to the internal request RQ_i.

In operation S240, the host interface block 128, the FTL 123, and the memory interface block 129 may process the internal command CMD_i thus received. For example, the host interface block 128, the FTL 123, and the memory interface block 129 may perform an operation corresponding to the internal command CMD_i.

In operation S250, the host interface block 128 may provide the internal NVMe driver DR_i with an internal response RES_i indicating that the internal command CMD_i is processed.

In operation S260, the internal NVMe driver DR_i may provide an internal output OUT_i (e.g., a result associated with the internal I/O) to the internal application APP_i in response to the internal response RES_i.

As described above, both the host I/O issued by the host device 110 and the internal I/O issued by the storage controller CTRL may be processed through the host interface block 128, the FTL 123, and the memory interface block 129 of the storage device 120. That is, because the host I/O and the internal I/O are processed through the same I/O path, the burden of designing a separate dedicated driver and a separate dedicated interface for processing the internal I/O may be alleviated.

Figure 5:
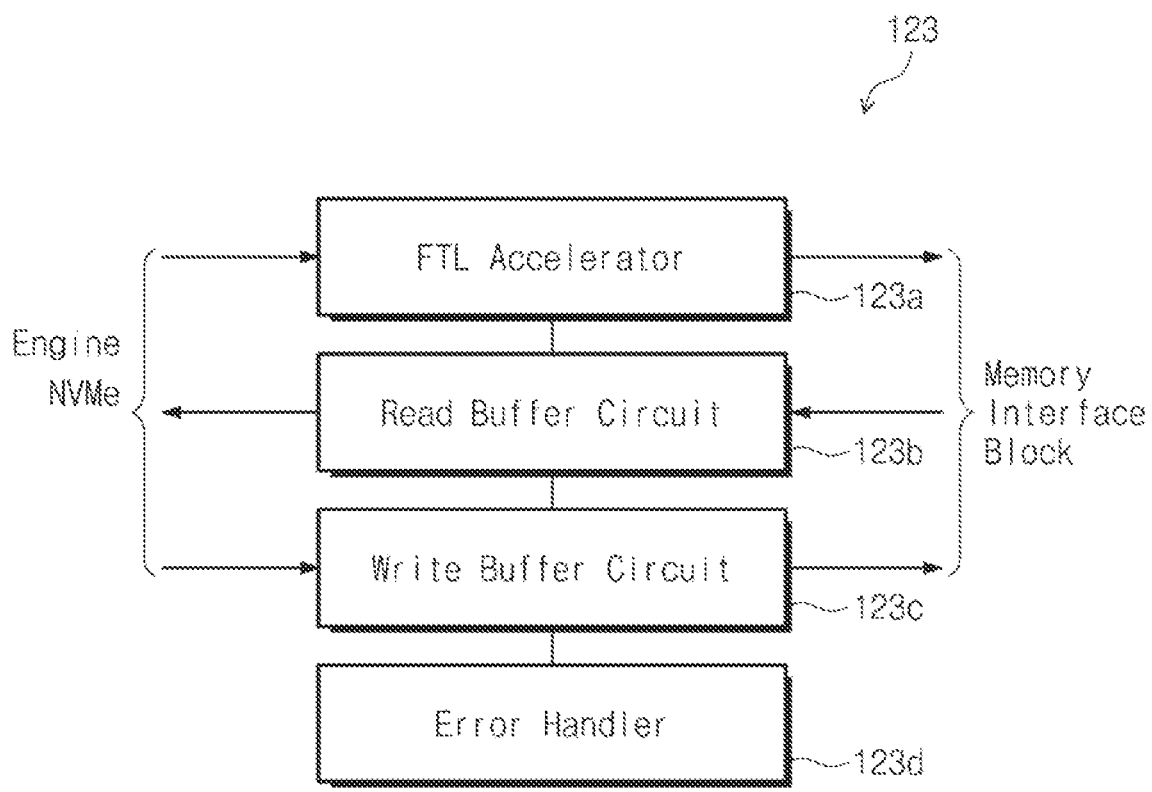
FIG. 5 is a block diagram illustrating an FTL, according to an embodiment.

FIG. 5 is a block diagram illustrating an FTL of FIG. 1. In an embodiment, an embodiment in which at least a part of functions of the FTL 123 are implemented as hardware or are automatized will be described with reference to FIG. 5, but an embodiment is not limited thereto. For example, the FTL 123 may be implemented by software and may be driven by the CPU 121 of the storage controller CTRL.

Referring to FIGS. 1 and 5, the FTL 123 may include an FTL accelerator 123a, a read buffer circuit 123b, a write buffer circuit 123c, and an error handler 123d. In an embodiment, each of the FTL accelerator 123a, the read buffer circuit 123b, the write buffer circuit 123c, and the error handler 123d may be implemented as a hardware circuit configured to automatize at least a part of the functions of the FTL 123.

The FTL accelerator 123a may be a hardware circuit configured to automatize a function of the FTL 123, such as address mapping or block allocation. The FTL accelerator 123a may perform address mapping or block allocation, based on information provided from the NVMe engine 128b. For example, the FTL accelerator 123a may translate a logical address provided from the NVMe engine 128b into a physical address of the NVM device 119. Information about the translated physical address may be provided to the memory interface block 129.

The read buffer circuit 123b may be a hardware circuit configured to automatize a data path associated with a read operation of the storage device 120. For example, the read buffer circuit 123b may be a hardware circuit configured to temporarily store read data provided from the memory interface block 129 and to transfer the temporarily stored read data to the NVMe engine 128b.

The write buffer circuit 123c may be a hardware circuit configured to automatize a data path associated with a write operation of the storage device 120. For example, the write buffer circuit 123c may be a hardware circuit configured to temporarily store write data provided from the NVMe engine 128b and to transfer the temporarily stored write data to the memory interface block 129.

The error handler 123d may be a hardware circuit configured to process various error situations (e.g., a data hazard) occurring during an operation of the FTL 123.

In an embodiment, the read buffer circuit 123b, the write buffer circuit 123c, and the error handler 123d may exchange data or information with each other under control of the FTL accelerator 123a.

As described above, the FTL 123 may be implemented through hardware circuits configured to automatize all or a part of the functions thereof. In this case, compared to the case where the FTL 123 is implemented by software, the performance of the storage device 120 (or the storage controller CTRL including the FTL 123) may be provided.

In an embodiment, the FTL 123 automatized through a hardware circuit(s) may be designed such that optimization is made between the host interface block 128 (or the NVMe engine 128b) and the memory interface block 129. In this case, like in the embodiment of FIG. 2, in the case where an internal I/O issued by the internal application APP_i of the storage controller CTRL is directly provided to the FTL 123 through the dedicated driver dr_d, there is a need to again design the existing optimized FTL 123, or the performance of the FTL 123 might not be optimized.

In contrast, according to an embodiment, in the case where an internal I/O issued by the internal application APP_i of the storage controller CTRL is provided to the NVMe engine 128b through the internal NVMe driver DR_i, because the FTL 123 is provided with information about the internal I/O through the NVMe engine 128b, the separate burden of again designing the automatized FTL 123 may be alleviated, and the optimum performance of the automatized FTL 123 may be secured.

Figure 6:
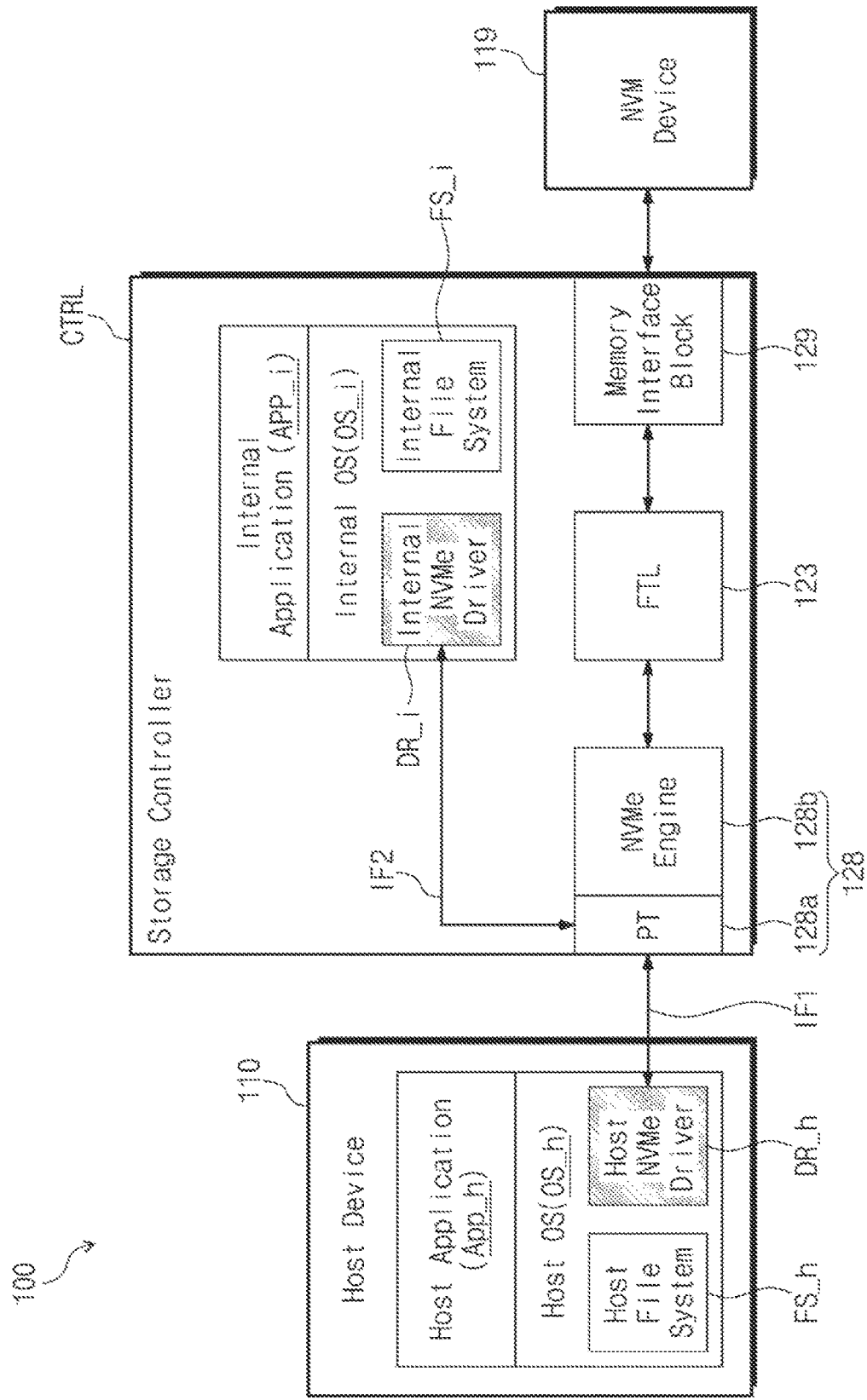
FIG. 6 is a block diagram illustrating a storage system, according to an embodiment.

FIG. 6 is a block diagram illustrating a storage system of FIG. 1. Internal components and operations of the storage system 100 are described above, and thus, redundant description will be omitted.

In an embodiment of FIG. 6, the internal NVMe driver DR_i may communicate with the PT 128a. In this case, a second interface IF2 may be configured to have the same communication protocol as the first interface IF1 or to include the same signal lines as the first interface IF1. In an embodiment, the PT 128a may be configured to be connected with the system bus BUS, and the internal NVMe driver DR_i may communicate with the PT 128a through the system bus BUS. In an embodiment, the PT 128a may include first signal pins configured to communicate with the host NVMe driver DR_h and second signal pins configured to communicate with the internal NVMe driver DR_i. Alternatively, the PT 128a may include shared signal pins that are shared by the host NVMe driver DR_h and the internal NVMe driver DR_i.

In an embodiment, in the case where the internal NVMe driver DR_i directly communicates with the PT 128a, the internal NVMe driver DR_i may have the same hardware layer or the same software layer as the host NVMe driver DR_h. Because the internal NVMe driver DR_i directly communicates with the physical port 128a, the burden of designing communication virtualization between the internal NVMe driver DR_i and the NVMe engine 128b may be alleviated.

Figure 7A:
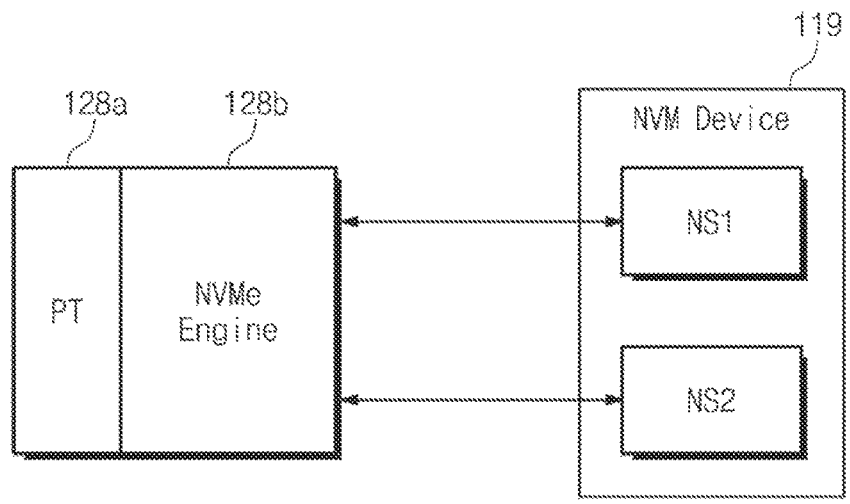
FIGS. 7A and 7B are diagrams for describing a storage space managed by a storage device, according to an embodiment.
Figure 7B:
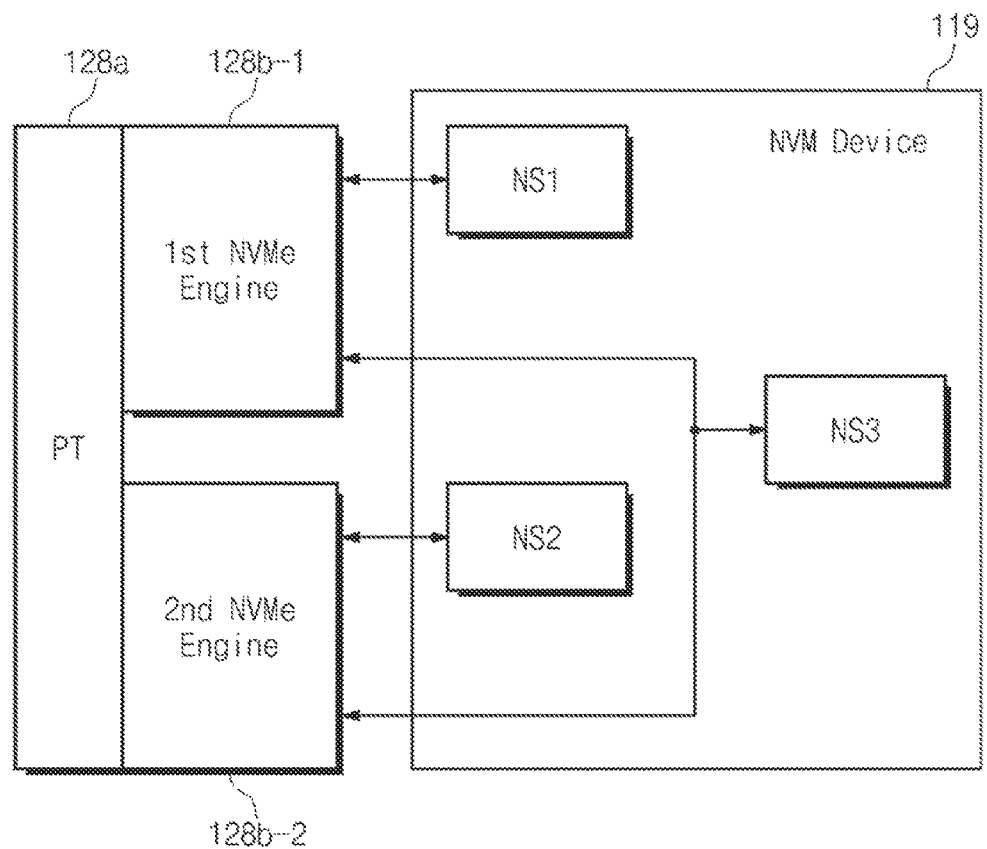

FIGS. 7A and 7B are diagrams for describing a storage space managed by a storage device of FIG. 1. For convenience of description, a storage space of the storage device 120 is conceptually illustrated in FIGS. 7A and 7B, but an embodiment is not limited thereto.

First, referring to FIGS. 1, 3, 6, and 7A, the NVMe engine 128b may receive a host I/O issued from the host device 110 through the PT 128a or may receive an internal I/O issued by the internal application APP_i through the PT 128a. Alternatively, the NVMe engine 128b may directly receive the internal I/O issued by the internal application APP_i.

The NVMe engine 128b may manage the storage space of the NVM device 119 by using a first namespace NS1 and a second namespace NS2. In an embodiment, a namespace may indicate a size of a non-volatile memory capable of being formatted to logical blocks, as a part of the storage space of the NVM device 119.

The first namespace NS1 may be allocated to the host application APP_h of the host device 110, and the second namespace NS2 may be allocated to the internal application APP_i of the storage controller CTRL. In this case, the NVMe engine 128b may process the host I/O in the first namespace NS1 and may process the internal I/O in the second namespace NS2.

In an embodiment, the internal application APP_i may access data that are managed by the host application APP_h. In this case, the NVMe engine 128b may process the internal I/O issued by the internal application APP_i by using the first namespace NS1. Alternatively, the host application APP_h may access data that are managed by the internal application APP_i. In this case, the NVMe engine 128b may process the host I/O issued by the host application APP_h by using the second namespace NS2.

That is, according to an embodiment, because the internal I/O issued by the internal application APP_i of the storage controller CTRL is processed through the NVMe engine 128*b*, data exchange between the internal application APP_i and the host application APP_h may be possible without the additional burden on design.

Next, referring to FIGS. 1, 3, 6, and 7B, the NVMe engine 128*b* may be divided into a first NVMe engine 128*b*-1 and a second NVMe engine 128*b*-2. The first NVMe engine 128*b*-1 may receive a host I/O or a host command from the host NVMe driver DR_h through the PT 128*a*. The first NVMe engine 128*b*-1 may be configured to process the received host I/O or host command and to manage the first namespace NS1. The second NVMe engine 128*b*-2 may directly receive an internal I/O or an internal command from the internal NVMe driver DR_i or may receive the internal I/O or the internal command from the internal NVMe driver DR_i through the PT 128*a*. The second NVMe engine 128*b*-2 may be configured to process the received internal I/O or internal command and to manage the second namespace NS2.

In an embodiment, the first NVMe engine 128*b*-1 and the second NVMe engine 128*b*-2 may together manage a third namespace NS3 or may share the third namespace NS3. In an embodiment, the third namespace NS3 may be a storage space configured to manage data that are shared between the internal application APP_i and the host application APP_h. In this case, data may be shared between the internal application APP_i and the host application APP_h through the third namespace NS3.

In an embodiment, the first and second NVMe engine 128*b*-1 and 128*b*-2 may be configured to support single-root I/O virtualization and sharing (SR-IOV). One of the first and second NVMe engine 128*b*-1 and 128*b*-2 may be a PF being a PCI-express function supporting the SR-IOV function, and the other may be a virtual function (VF) supported by the PF. In an embodiment, the PF and the VF may support an NVMe controller sharing the VNM sub-system.

The processing of a host command and an internal command associated with different namespaces is described with reference to FIGS. 7A and 7B, but an embodiment is not limited thereto. For example, the NVMe engine 128*b* may divide and manage the NVM device 119 into non-volatile memory sets, and a host command and an internal command may be processed with respect to different non-volatile memory sets. A non-volatile memory set may indicate a set of logically or physically classified non-volatile memories of the NVM device 119. In an embodiment, one non-volatile memory set may include one or more namespaces.

Figure 8:
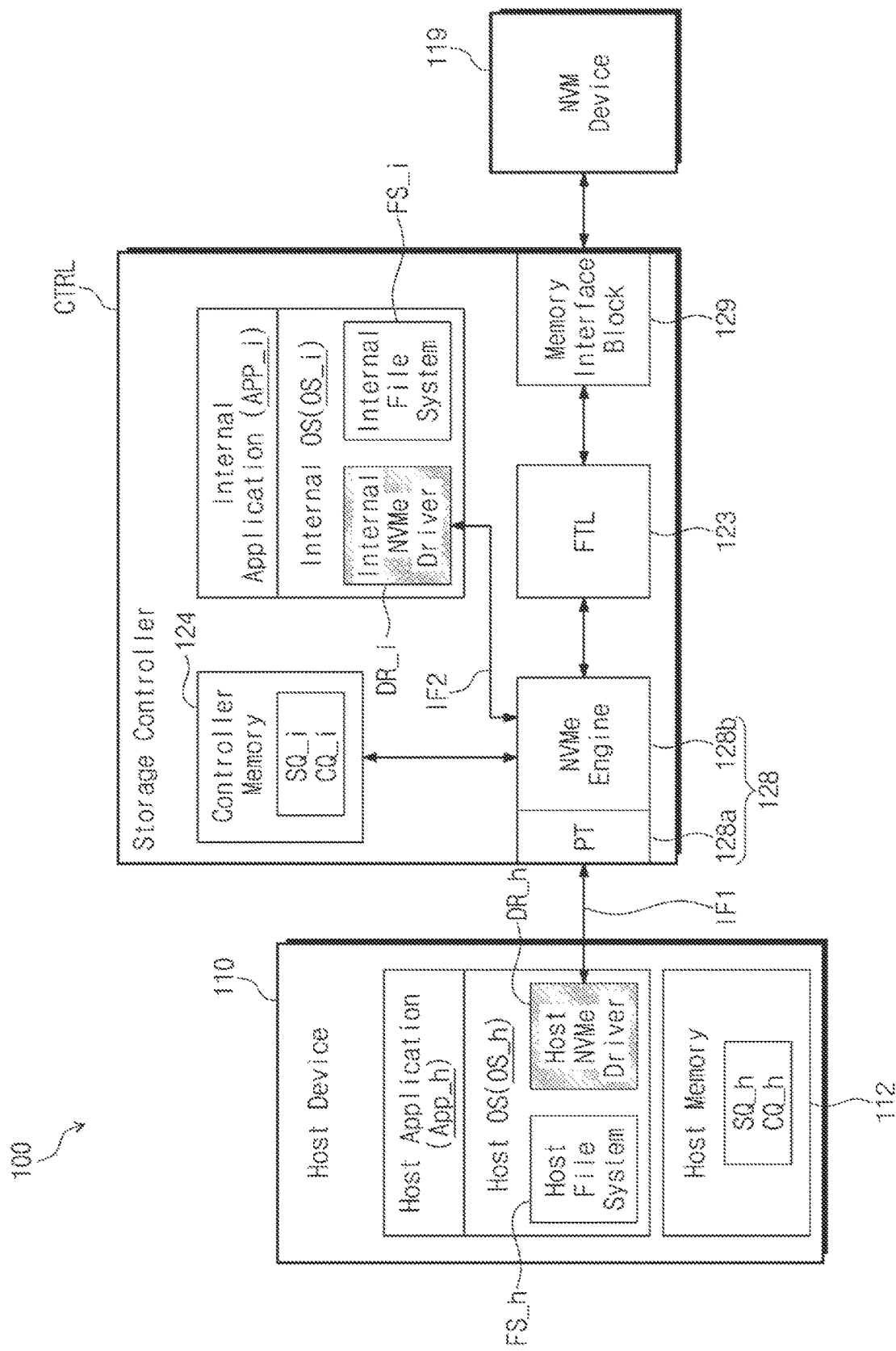
FIG. 8 is a block diagram illustrating a storage system, according to an embodiment.

FIG. 8 is a block diagram illustrating a storage system, according to an embodiment. For convenience of description, redundant description associated with the components described above will be omitted.

In an embodiment, the host device 110 may include a host memory 112 including a host submission queue SQ_h and a host completion queue CQ_h. The host submission queue SQ_h and the host completion queue CQ_h may be used to process a host I/O issued by the host application APP_h.

For example, the host NVMe driver DR_h may add a host command corresponding to the host I/O issued by the host application APP_h to the host submission queue SQ_h (i.e., may enqueue the host command). Afterwards, the host NVMe driver DR_h may send or write doorbell signaling to an NVMe engine 128*b* through the first interface IF1. The NVMe engine 128*b* may fetch the host command from the host submission queue SQ_h of the host memory 112 in response to the doorbell signaling. The NVMe engine 128*b* may process the fetched host command and may add completion information, which indicates that the fetched host command is processed, to the host completion queue CQ_h of the host memory 112. Afterwards, the NVMe engine 128*b* may generate an interrupt to the host NVMe driver DR_h. The host NVMe driver DR_h may check the completion information stored in the host completion queue CQ_h of the host memory 112 in response to the interrupt. Afterwards, the host NVMe driver DR_h may send, to the NVMe engine 128*b*, a doorbell providing notification that the completion information is checked (or the host completion queue CQ_h is released).

As described above, the host I/O issued by the host application APP_h may be processed in compliance with the NVMe standard being a standard corresponding to the first interface IF1. However, an embodiment is not limited thereto. The host I/O issued by the host application APP_h may be processed based on various different interface standards.

In an embodiment, a controller memory 124 of the storage controller CTRL may include an internal submission queue SQ_i and an internal completion queue CQ_i. The internal submission queue SQ_i and the internal completion queue CQ_i may be used to process an internal I/O issued by the internal application APP_i.

For example, an internal I/O issued by the internal application APP_i of the storage controller CTRL may be processed through the internal NVMe driver DR_i. The internal NVMe driver DR_i may add an internal command corresponding to the internal I/O to the internal submission queue SQ_i of the controller memory 124 through the NVMe engine 128*b*. At the same time, the internal NVMe driver DR_i may provide doorbell signaling to the NVMe engine 128*b*. The NVMe engine 128*b* may process the internal command added to the internal submission queue SQ_i of the controller memory 124 in response to the doorbell signaling, and the NVMe engine 128*b* may provide completion information about the processing to the internal NVMe driver DR_i or may store the completion information in the internal completion queue CQ_i of the controller memory 124.

As described above, a host I/O issued by the host application APP_h may be processed through the host submission queue SQ_h and the host completion queue CQ_h included in the host memory 112 of the host device 110. An internal I/O issued by the internal application APP_i may be processed through the internal submission queue SQ_i and the internal completion queue CQ_i included in the controller memory 124 of the storage controller CTRL.

In an embodiment, in terms of the NVMe engine 128*b*, a host I/O issued by the host application APP_h may be processed based on a host memory buffer (HMB) function, and an internal I/O issued by the internal application APP_i may be processed based on a controller memory buffer (CMB) function.

Figure 9:
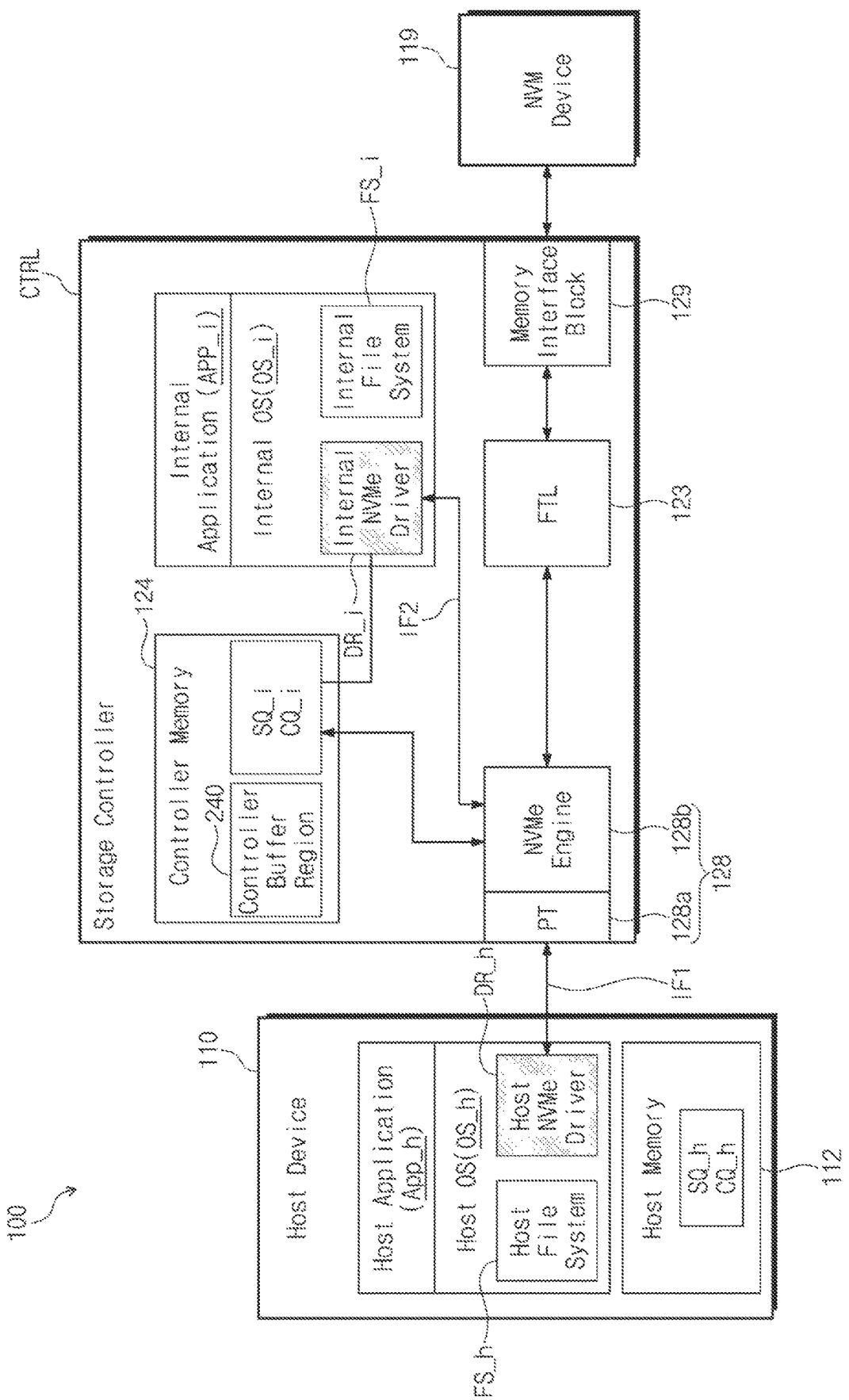
FIG. 9 is a block diagram illustrating a storage device, according to an embodiment.

FIG. 9 is a block diagram illustrating a storage device, according to an embodiment. Some components will be omitted for convenience of description, but an embodiment is not limited thereto. Also, redundant descriptions will be omitted.

In an embodiment, the internal NVMe driver DR_i may directly access the internal submission queue SQ_i and the internal completion queue CQ_i of the controller memory 124.

In this case, through the second interface IF2, the internal NVMe driver DR_i may process the internal command similar to that of the host NVMe driver DR_h. For example, the internal NVMe driver DR_i may add an internal command to the internal submission queue SQ_i of the controller memory 124 and may send or write doorbell signaling to the NVMe engine 128b. The NVMe engine 128b may fetch the internal command from the internal submission queue SQ_i of the controller memory 124 in response to the doorbell signaling and may process the fetched internal command. The NVMe engine 128b may write completion information, which indicates that the fetched internal command is completed processed, in the internal completion queue CQ_i of the controller memory 124 and may generate an interrupt to the internal NVMe driver DR_i. The internal NVMe driver DR_i may check the completion information stored in the internal completion queue CQ_i of the controller memory 124 in response to the interrupt.

As described above, in terms of the NVMe engine 128b, a host I/O issued by the host application APP_h and an internal I/O issued by the internal application APP_i may be processed based on an HMB function. In this case, a partial region (e.g., a region including the internal submission queue SQ_i and the internal completion queue CQ_i) of the controller memory 124 may be recognized as a region having a function similar to that of an HMB of the NVMe engine 128b.

In an embodiment, the controller memory 124 may further include a controller buffer region 240. The controller buffer region may be configured to store a variety of information for the storage controller CTRL to operate or to temporarily store read data and write data. In an embodiment, in the controller memory 124, the internal submission queue SQ_i and the internal completion queue CQ_i may be regions physically or logically separated from the controller buffer region.

In an embodiment, even though the internal submission queue SQ_i, the internal completion queue CQ_i, and the controller buffer region are illustrated as being included in the controller memory 124, an embodiment is not limited thereto. For example, the internal submission queue SQ_i and the internal completion queue CQ_i may be included in a separate memory physically separated from the controller memory 124, and the separate memory may communicate with the internal NVMe driver DR_i through the system bus BUS or a dedicated channel.

Figure 10:
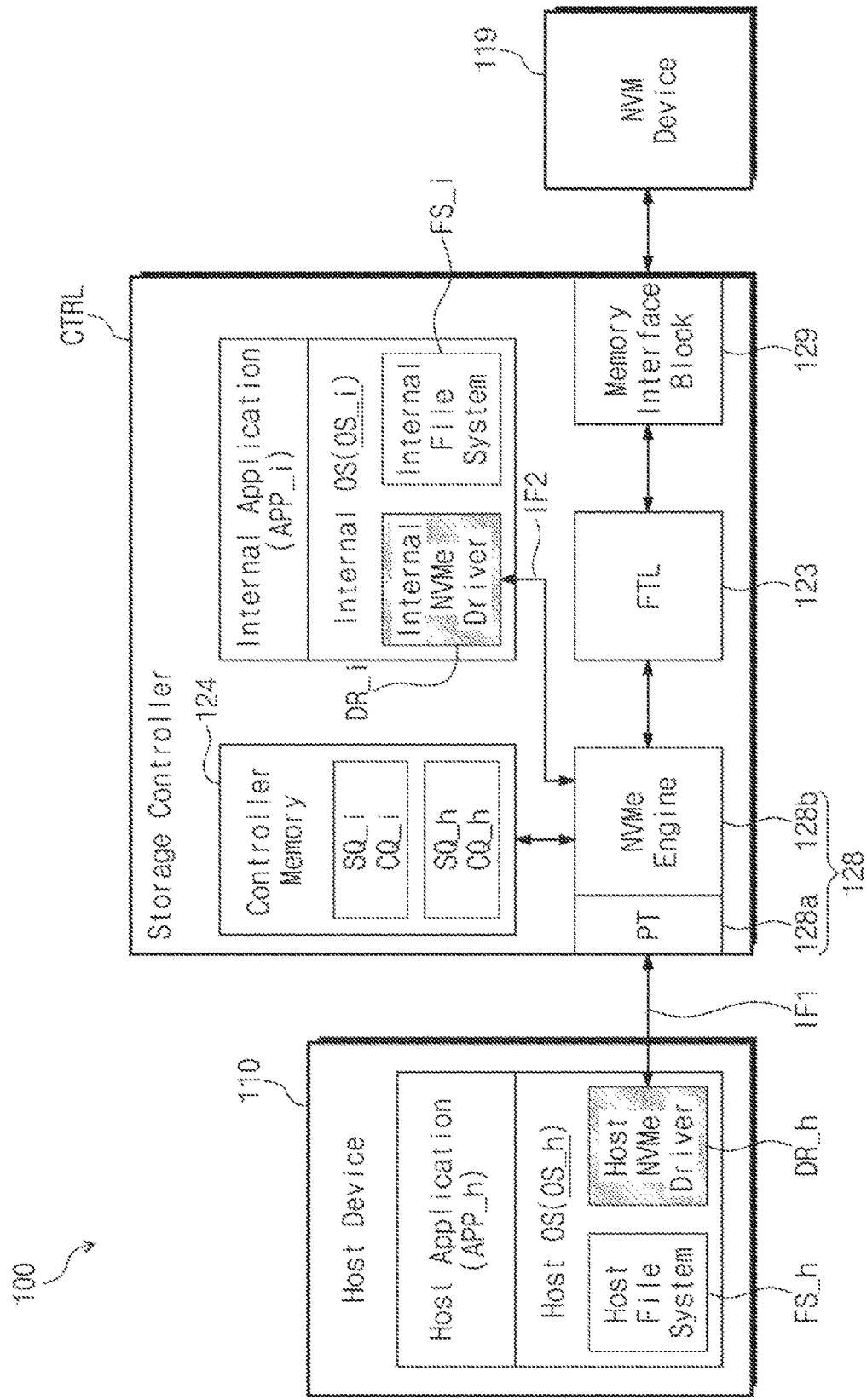
FIG. 10 is a block diagram illustrating a storage system, according to an embodiment.

FIG. 10 is a block diagram illustrating a storage system, according to an embodiment. For convenience of description, redundant description associated with the components described above will be omitted.

In an embodiment, the host submission queue SQ_h and the host completion queue CQ_h may be included in the controller memory 124 of the storage controller CTRL. That is, the host device 110 may process a host I/O issued by the host application APP_h by using the host submission queue SQ_h and the host completion queue CQ_h included in the controller memory 124. In an embodiment, in the case where the first interface IF1 between the host device 110 and the storage device 120 is based on the NVMe standard, the host device 110 may be configured to process a host I/O based on a CMB function defined in the NVMe standard.

As described above, because the host NVMe driver DR_h and the internal NVMe driver DR_i share the same NVMe engine 128b, the NVMe engine 128b may efficiently process a host I/O associated with the host NVMe driver DR_h and an internal I/O associated with the internal NVMe driver DR_i. For example, in the case where an internal I/O issued by the internal application APP_i is directly processed through an FTL 123 without passing through the NVMe engine 128b, the NVMe engine 128b does not perform command arbitration for the internal I/O. In this case, a command processing delay between the internal I/O and the host I/O, that is, a hazard case may occur. In contrast, in the case where an internal I/O issued by the internal application APP_i is processed through the NVMe engine 128b, because the NVMe engine 128b manages both the host submission queue SQ_h and the internal submission queue SQ_i, the NVMe engine 128b may perform appropriate command arbitration based on a priority of each of the host I/O and the internal I/O. In this case, the overall performance of the storage device 120 may be improved.

In the above embodiments, the host submission queue SQ_h, the host completion queue CQ_h, the internal submission queue SQ_i, and the internal completion queue CQ_i are described, but an embodiment is not limited thereto. The host memory 112 or the controller memory 124 may further include a host admin queue configured to store a host admin command issued by the host device 110 for various administration operations for the storage device 120 and a host admin completion queue configured to store completion information about the host admin command. Alternatively, the host memory 112 or the controller memory 124 may further include an internal admin queue configured to store an internal admin command issued by the storage controller CTRL for various administration operations for the storage device 120 and an internal admin completion queue configured to store completion information about the internal admin command.

Figure 11:
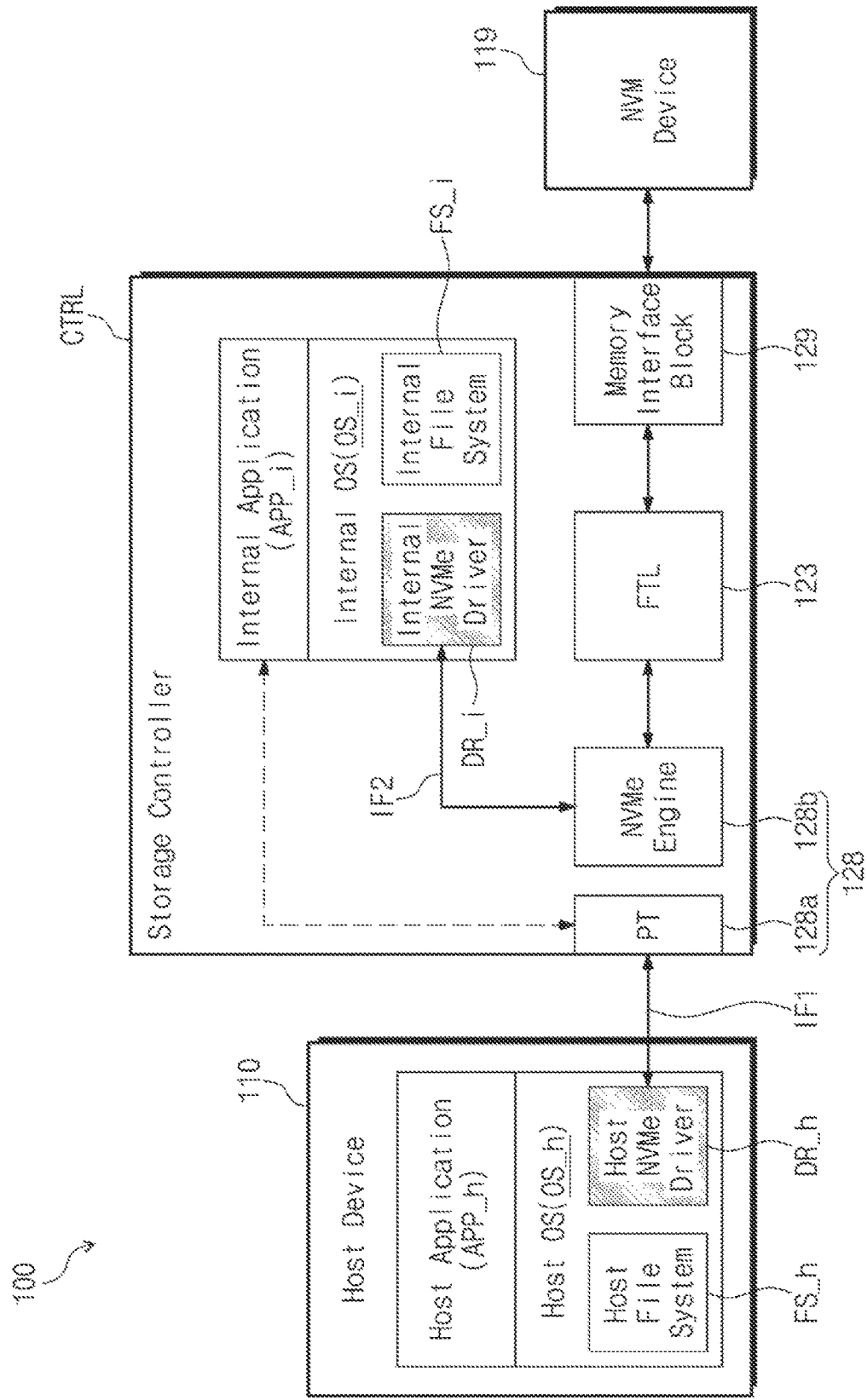
FIG. 11 is a block diagram illustrating a storage system, according to an embodiment.

FIG. 11 is a block diagram illustrating a storage system, according to an embodiment. Some components will be omitted for convenience of description, but an embodiment is not limited thereto. Also, redundant descriptions will be omitted.

As illustrated in FIG. 11, the host device 110 may provide a signal (e.g., a host command) corresponding to a host I/O issued by the host application APP_h to a PT 128a of the storage controller CTRL. The signal received through the PT 128a may be provided to the internal application APP_i. The internal application APP_i may process the signal (i.e., the host command), which is provided through the PT 128a, through the internal NVMe driver DR_i.

For example, the internal application APP_i may perform various internal computations (or operations). In this case, an internal I/O issued by the internal application APP_i may be provided to an NVMe engine 128b through the internal file system FS_i and the internal NVMe driver DR_i. The internal application APP_i may further process the signal (i.e., the host command) provided through the PT 128a. In this case, the internal application APP_i may provide the received signal (i.e., the host command) to the NVMe engine 128b through the internal NVMe driver DR_i without passing through the internal file system FS_i. The reason is that there is no need to additionally organize the signal (i.e., the host command) received through the PT 128a by using the internal file system FS_i because the received signal is already organized through the host file system FS_h.

That is, the internal application APP_i of the storage controller CTRL may process an internal I/O through the internal file system FS_i and the internal NVMe driver DR_i; also, the internal application APP_i may process a host I/O or a host command through the internal NVMe driver DR_i without passing through the internal file system FS_i.

Figure 12:
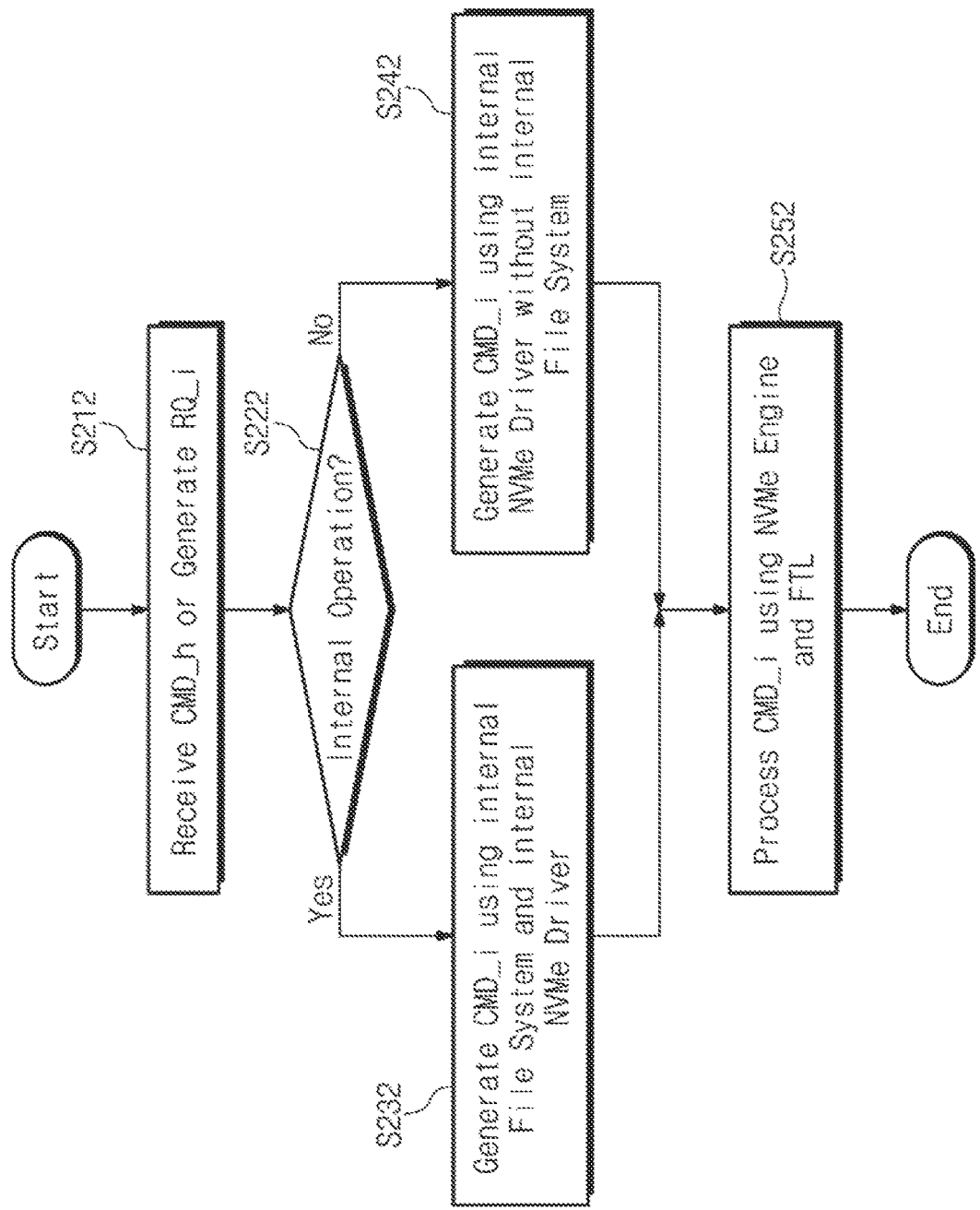
FIG. 12 is a flowchart illustrating an operation of a storage controller, according to an embodiment.

FIG. 12 is a flowchart illustrating an operation of a storage controller of FIG. 11. Referring to FIGS. 11 and 12, in operation S212, the storage controller CTRL may receive the host command CMD_h or may generate an internal I/O. For example, the storage controller CTRL may receive the host command CMD_h from the host device 110 through the PT 128*a*. The received host command CMD_h may be transferred to the internal application APP_i. Alternatively, the storage controller CTRL may generate request RQ_i corresponding to an internal I/O. As described above, the internal I/O may be issued by the internal application APP_i of the storage controller CTRL. In an embodiment, the internal application APP_i may issue an internal I/O for its own computation (or operation), may issue an internal I/O in response to the host command CMD_h, or may issue an internal I/O to process the host command CMD_h.

In operation S222, the storage controller CTRL may determine whether the host command CMD_h or the internal I/O is associated with an internal operation. For example, whether a to-be-processed operation of the storage controller CTRL is an internal operation or a host operation (i.e., an operation corresponding to a host I/O) may be determined. In an embodiment, the storage controller CTRL may determine the internal I/O issued by the internal application APP_i as being associated with the internal operation and may determine the host command received through the PT 128*a* as being associated with the host operation. Alternatively, the storage controller CTRL may determine whether the operation to be processed is an internal operation or a host operation, based on a namespace associated with the operation to be processed.

When it is determined that the operation to be processed is associated with the internal operation, in operation S232, the storage controller CTRL may generate the internal command CMD_i by using the internal file system FS_i and the internal NVMe driver DR_i. For example, the storage controller CTRL may organize information (e.g., an internal I/O or a host command) about the operation to be processed through the internal file system FS_i and may convert the organized information into a signal appropriate for the second interface IF2 through the internal NVMe driver DR_i.

When it is determined that the operation to be processed is not associated with the internal operation or when it is determined that the operation to be processed is associated with the host operation, in operation S242, the storage controller CTRL may generate the internal command CMD_i based on information (e.g., an internal I/O or a host command) about the operation to be processed by using the internal NVMe driver DR_i, without passing through the internal file system FS_i. For example, when the operation to be processed is not associated with the internal operation or when the operation to be processed is associated with the host operation, relevant information (e.g., a host command) may be information that is already organized by the host file system FS_h. In an embodiment, for convenience of description, the description is given as a command generated by the internal NVMe driver DR_i is an internal command, but an embodiment is not limited thereto.

In operation S252, the storage controller CTRL may process the generated internal command CMD_i by using the NVMe engine 128*b* and an FTL 123. That is, because both an operation corresponding to a host I/O and an operation corresponding to an internal I/O are processed by using the NVMe engine 128*b* and the FTL 123, the burden of designing the storage device 120 may be alleviated.

Figure 13:
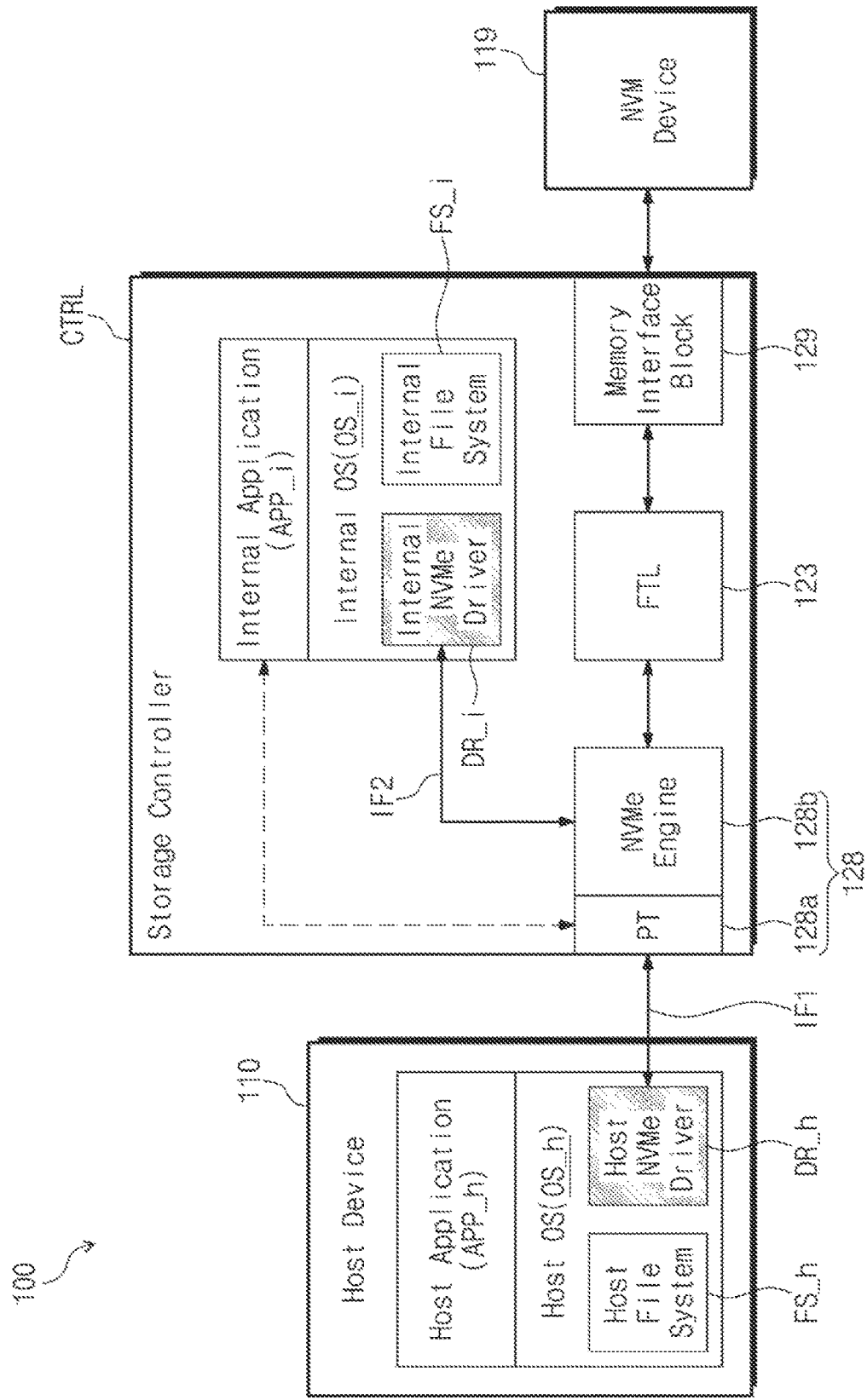
FIG. 13 is a block diagram illustrating a storage system, according to an embodiment.

FIG. 13 is a block diagram illustrating a storage system, according to an embodiment. For convenience of description, redundant description associated with the components described above will be omitted.

In an embodiment, the internal application APP_i may operate under control of the host device 110. For example, the host device 110 may provide, through a PT 128*a*, information, a signal, or a command for controlling the internal application APP_i of the storage controller CTRL. An NVMe engine 128*b* may provide the information, signal, or command received through the PT 128*a* to the internal application APP_i.

In an embodiment, the information, signal, or command received through the PT 128*a* may be associated with an operation to drive the internal application APP_i, such as a load, execution, input, or output operation for the internal application APP_i. The internal application APP_i may operate in response to the information, signal, or command received through the PT 128*a*. For example, the internal application APP_i may generate an internal I/O in response to the received information, signal, or command. The generated internal I/O may be processed through the internal file system FS_i, the internal NVMe driver DR_i, the NVMe engine 128*b*, an FTL 123, and a memory interface block 129.

In an embodiment, in the case where the information, signal, or command received through the PT 128*a* is associated with a host operation (e.g., a read operation or a write operation of the storage device 120), the NVMe engine 128*b* may directly process the information, signal, or command, which is received through the PT 128*a*, by using the FTL 123 without passing through the internal application APP_i.

As described above, the storage device 120 may drive the internal application APP_i under control of the host device 110, and an internal I/O issued by the internal application APP_i may be processed by using the internal NVMe driver DR_i and the NVMe engine 128*b*.

Figure 14:
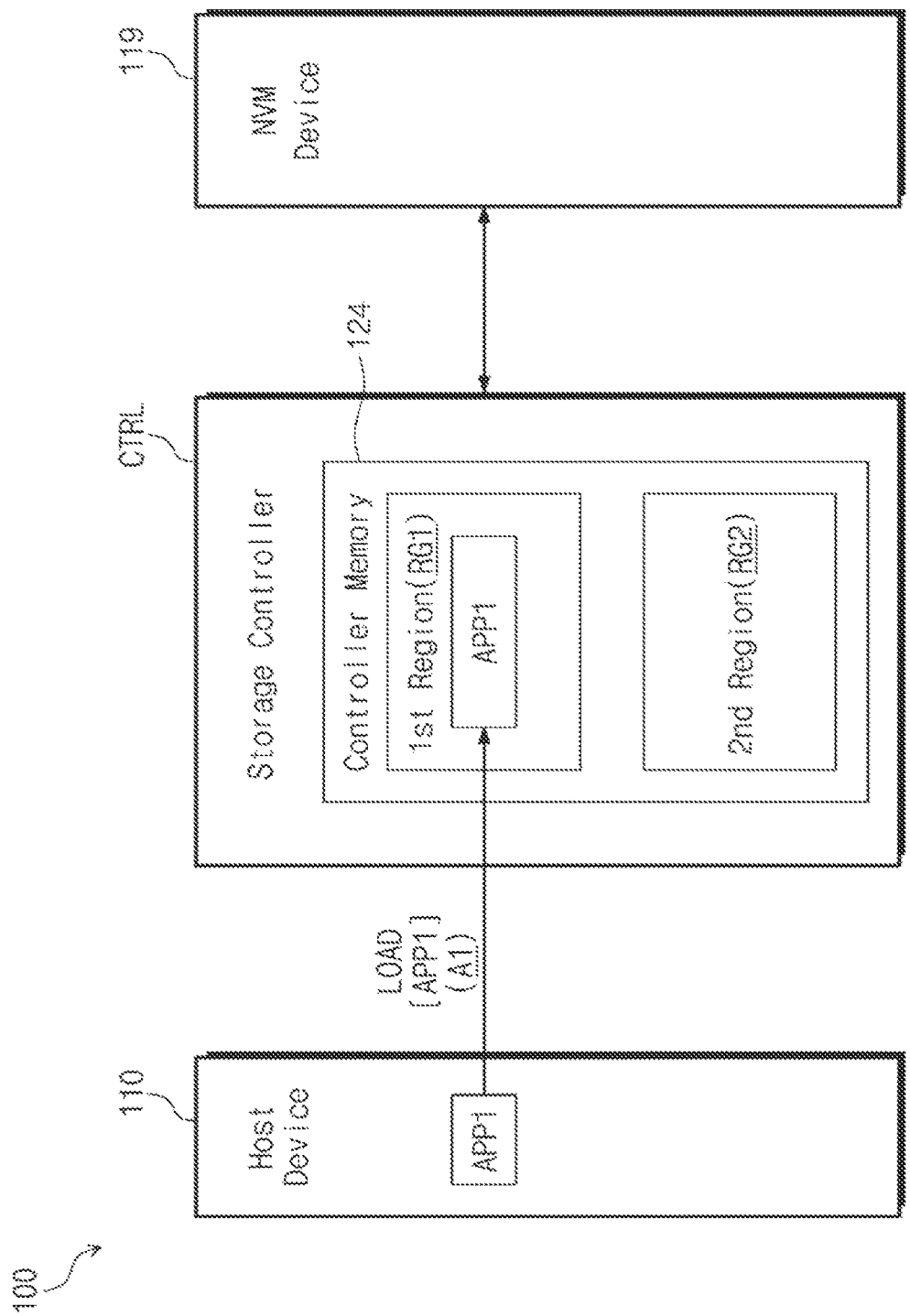
FIGS. 14, 15, and 16 are diagrams for describing an operation (e.g., internal application driving) of a storage device performed under control of a host device, according to an embodiment.
Figure 15:
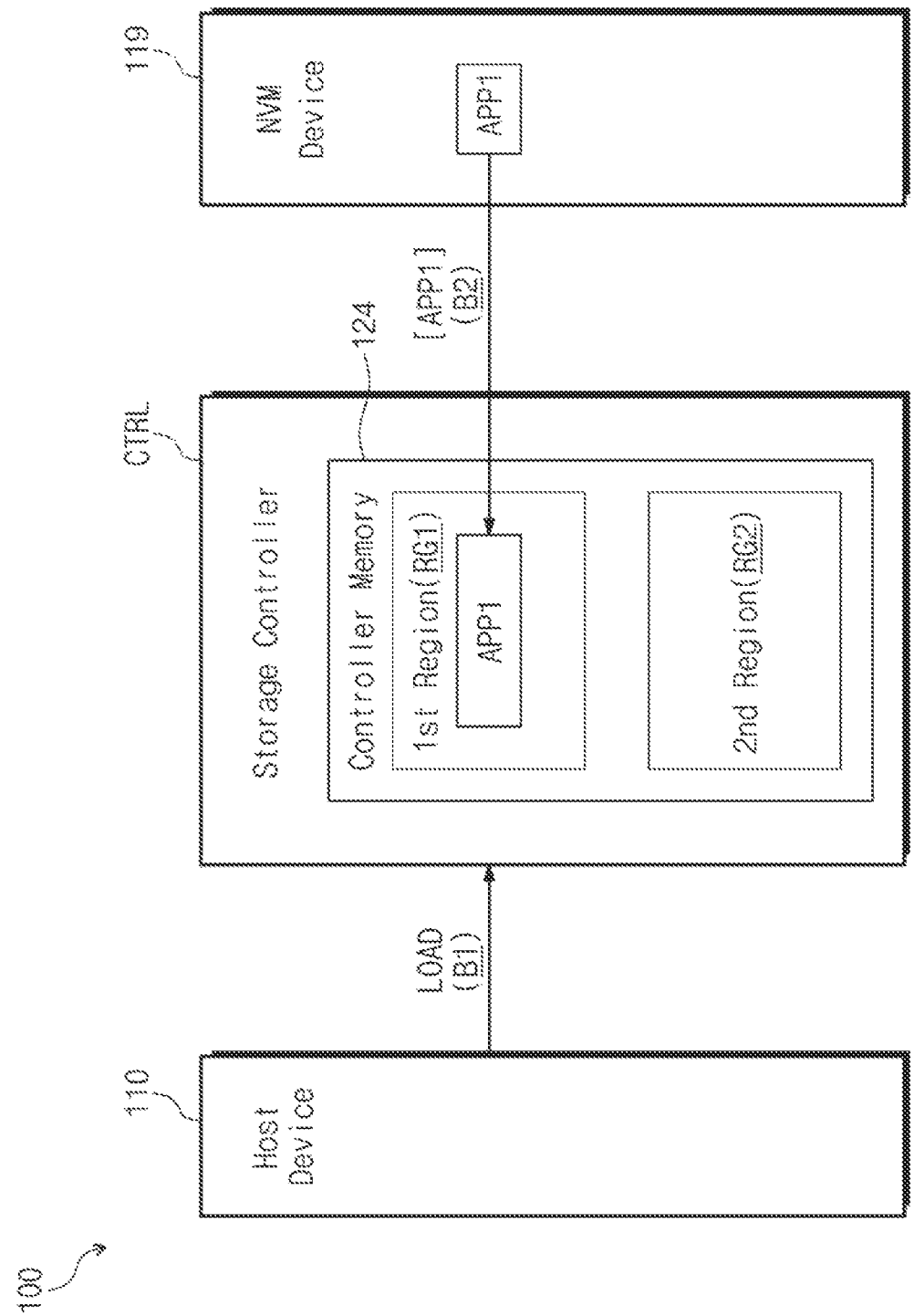
Figure 16:
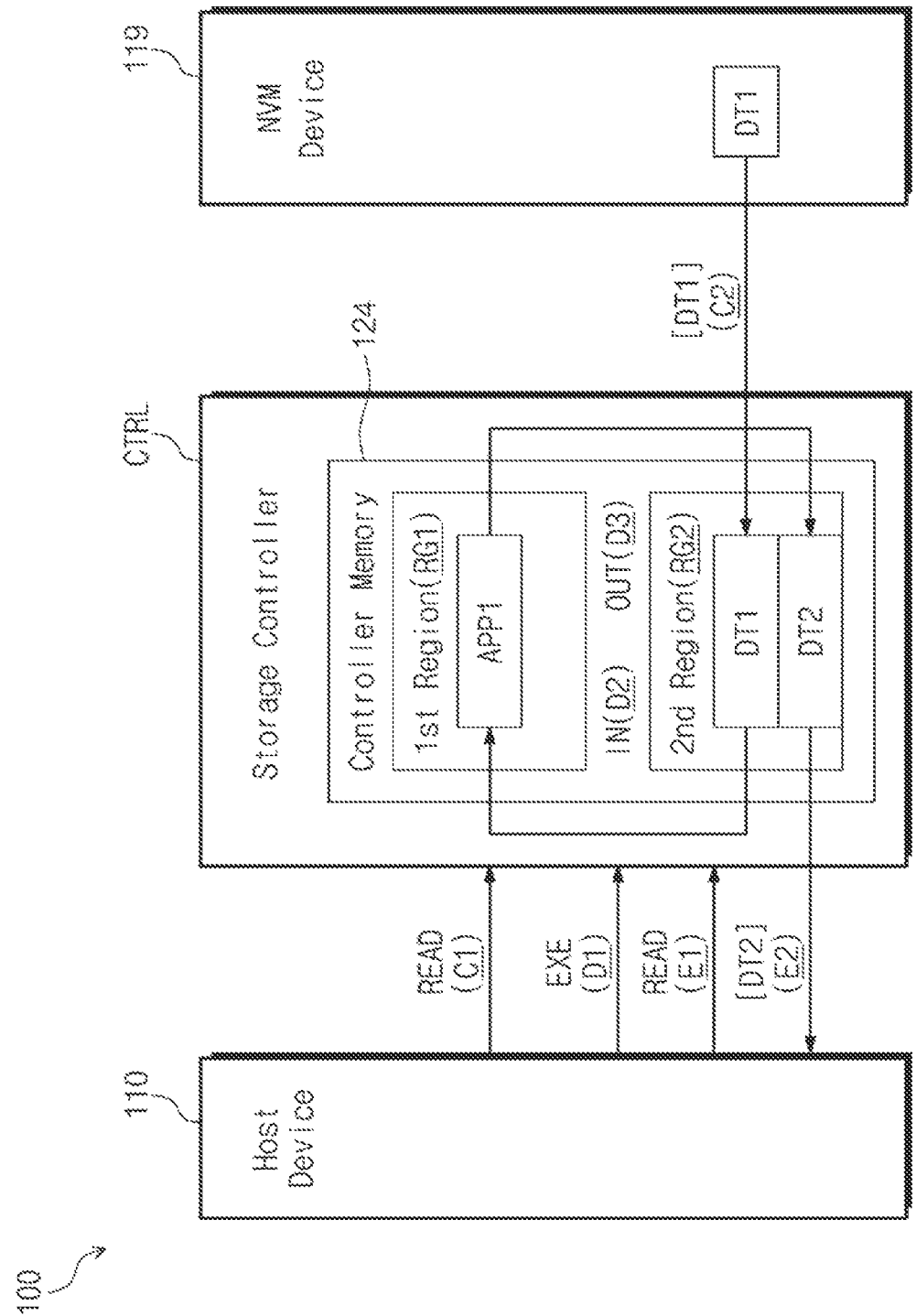

FIGS. 14 to 16 are diagrams for describing an operation (e.g., internal application driving) of a storage device performed under control of a host device. Some components will be omitted for brevity of drawing and convenience of description, but an embodiment is not limited thereto.

Referring to FIG. 14, a controller memory 124 may include a first region RG1 and a second region RG2. In an embodiment, the first region RG1 may be configured to store information or a program code associated with the internal application APP_i that is driven on the storage controller CTRL. The second region RG2 may be configured to store data managed or used by the internal application APP_i that is driven on the storage controller CTRL.

In an embodiment, the first and second regions RG1 and RG2 may be physically or logically divided in the controller memory 124. In an embodiment, the first and second regions RG1 and RG2 may be divided or managed by the storage controller CTRL, and information about the first and second regions RG1 and RG2 may be provided to the host device 110. In an embodiment, the first and second regions RG1 and RG2 may be managed or divided by the host device 110. The remaining components of the storage system 100 are described above, and thus, redundant description will be omitted.

In an embodiment, the host device 110 may be configured to load an internal application to be executed on the storage device 120.

For example, as illustrated in FIG. 14, the host device 110 may include a first application APP1 or a program code associated with the first application APP1. The host device 110 may load the first application APP1 onto the controller memory 124 of the storage controller CTRL by sending a load command LOAD and the first application APP1 to the storage controller CTRL (Phase A1). The first application APP1 received from the host device 110 may be stored in the first region RG1 of the controller memory 124, and the storage controller CTRL may drive the first application APP1 stored in the first region RG1 of the controller memory 124.

Alternatively, as illustrated in FIG. 15, the first application APP1 may be stored in the NVM device 119. In this case, the host device 110 may send the load command LOAD to the storage controller CTRL (Phase B1). In response to the load command LOAD, the storage controller CTRL may load the first application APP1 stored in the NVM device 119 onto the first region RG1 of the controller memory 124 (Phase B2).

In an embodiment, an operation in which the storage controller CTRL loads the first application APP1 from the NVM device 119 may be performed in a manner similar to the above manner of processing an internal I/O. That is, in response to the load command LOAD from the host device 110, the storage controller CTRL may generate an internal I/O for loading the first application APP1 from the NVM device 119, and the generated internal I/O may be processed based on the operational method described with reference to FIGS. 1 to 13. In more detail, the internal I/O may be processed through a host interface block of the storage controller CTRL, which is configured to receive the load command LOAD from the host device 110.

In an embodiment, the storage controller CTRL may be configured to drive an internal application to perform various operations under control of the host device 110. For example, as illustrated in FIG. 16, the host device 110 may send a first read command READ1 to the storage controller CTRL (Phase C1). The first read command READ1 may be a command for reading first data DT1 to be processed by the first application APP1. The storage controller CTRL may read the first data DT1 from the NVM device 119 in response to the first read command READ1 (Phase C2). The first data DT1 may be stored in the second region RG2 of the controller memory 124.

In an embodiment, the first read command READ1 of FIG. 16 may be different from a normal read command for a normal read operation (e.g., an operation in which the host device 110 reads data from the storage device 120) by the host device 110. For example, the first read command READ1 of FIG. 16 may be a command for loading the first data DT1, which the first application APP1 driven by the storage controller CTRL will process, onto the second region RG2 of the controller memory 124. In this case, in response to the first read command READ1, the storage controller CTRL may generate an internal I/O and may process the internal I/O based on the operational method described with reference to FIGS. 1 to 13.

The host device 110 may send an execute command EXE to the storage controller CTRL (Phase D1). The execute command EXE may be a command for initiating the execution of the first application APP1 by the storage controller CTRL. The storage controller CTRL may execute the first application APP1 in response to the execute command EXE. For example, under control of the storage controller CTRL, the first data DT1 may be provided to the first application APP1 (Phase D2). The first application APP1 may perform computation on the first data DT1 and may generate and output second data DT2 as a result of the computation (Phase D3). The second data DT2 may be stored in the second region RG2 of the controller memory 124.

In an embodiment, in the case where the first application APP1 is configured to directly access the controller memory 124 (e.g., as in the above description given with reference to FIG. 9, in the case where a computation engine driving the first application APP1 may directly access the controller memory 124), the first application APP1 or the computation engine may access the controller memory 124 without generating a separate internal I/O. Alternatively, in the case where the first application APP1 fails to directly access the controller memory 124 (e.g., as in the above description given with reference to FIG. 8, in the case where the computation engine driving the first application APP1 may access the controller memory 124 through an NVMe engine), the first application APP1 or the computation engine may generate an internal I/O, and the generated internal I/O may be processed based on the method described with reference to FIGS. 1 to 13.

The host device 110 may send a second read command READ2 to the storage controller CTRL (Phase E1). The storage controller CTRL may send the second data DT2 stored in the second region RG2 of the controller memory 124 to the host device 110 in response to the second read command READ2 (Phase E2). In an embodiment, the second read command READ2 may be a read command for a read operation that is performed without intervention of the internal application of the storage controller CTRL (i.e., the first application APP1).

As described above, a storage device according to an embodiment may drive an internal application configured to perform various computations (or operations). In this case, an internal I/O issued by the internal application may be provided to an NVMe engine through an internal NVMe driver. That is, because an internal application that is driven in the storage device shares the NVMe engine with a host device, a host I/O and an internal I/O may be efficiently processed without the additional burden on design.

Figure 17:
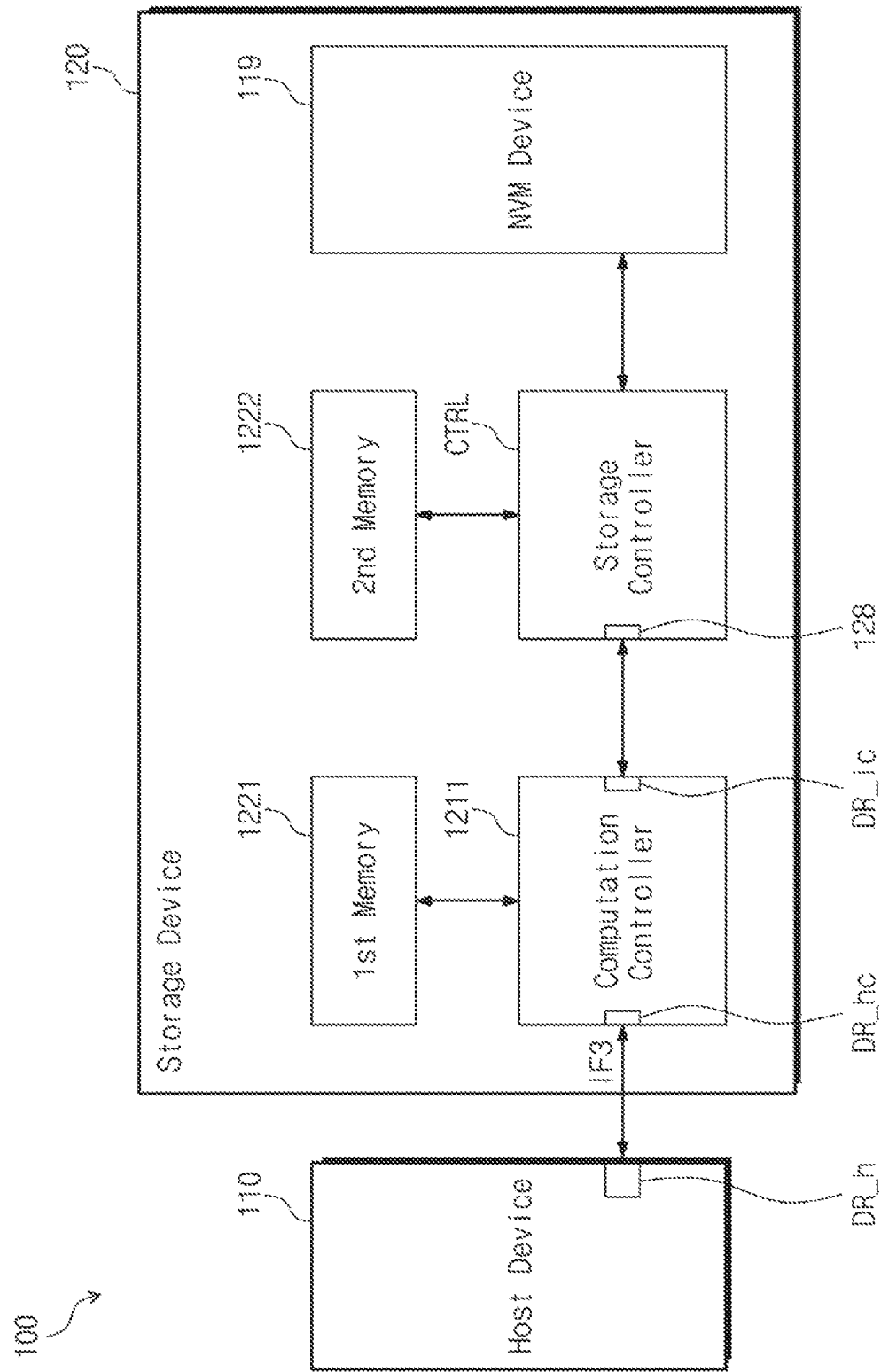
FIGS. 17, 18, 19, 20, and 21 are block diagrams illustrating storage systems, according to some embodiments.

FIG. 17 is a block diagram illustrating a storage system, according to an embodiment. In some embodiments described above, a storage device may execute the internal application APP_i through one storage controller CTRL to perform various computations (or operations) and to control the NVM device 119. However, an embodiment is not limited thereto. For example, the storage device may separately include a computation controller configured to perform computation.

Referring to FIG. 17, the storage device 120 may be a computational storage device having a computation function.

The host device 110 may be configured to read data stored in the storage device 120 or to store data in the storage device 120. Alternatively, the host device 110 may provide a computation request to the storage device 120 such that the storage device 120 performs specific computation.

The storage device 120 may include a computation controller 1211, e.g., a computation processor, a storage controller CTRL, a first memory 1221, a second memory 1222, and the NVM device 119.

The computation controller 1211 may operate in response to a request of the host device 110. For example, the computation controller 1211 may be configured to perform computation depending on a request of the host device 110 or to transfer the request of the host device 110 to the storage controller CTRL. In an embodiment, the computation controller 1211 may communicate with the host device 110 through a third interface IF3. The third interface IF3 may be an interface complying with the NVMe standard, but an embodiment is not limited thereto. In this case, the host device 110 may have the NVMe driver DR_h configured to communicate with the NVMe driver DR_hc of the computation controller 1211.

The first memory 1221 may be used as a buffer memory or a working memory of the computation controller 1211.

For example, the first memory 1221 may be configured to store a program code for an internal application executable by the computation controller 1211 or to store data used or managed by the computation controller 1211.

The storage controller CTRL may be configured to control the NVM device 119 based on a request or a command from the computation controller 1211. In an embodiment, the storage controller CTRL may communicate with the computation controller 1211 in compliance with the NVMe interface standard. That is, the storage controller CTRL may be configured to process a host I/O issued by the host device 110 and an internal I/O issued by the computation controller 1211 through the same path.

Figure 18:
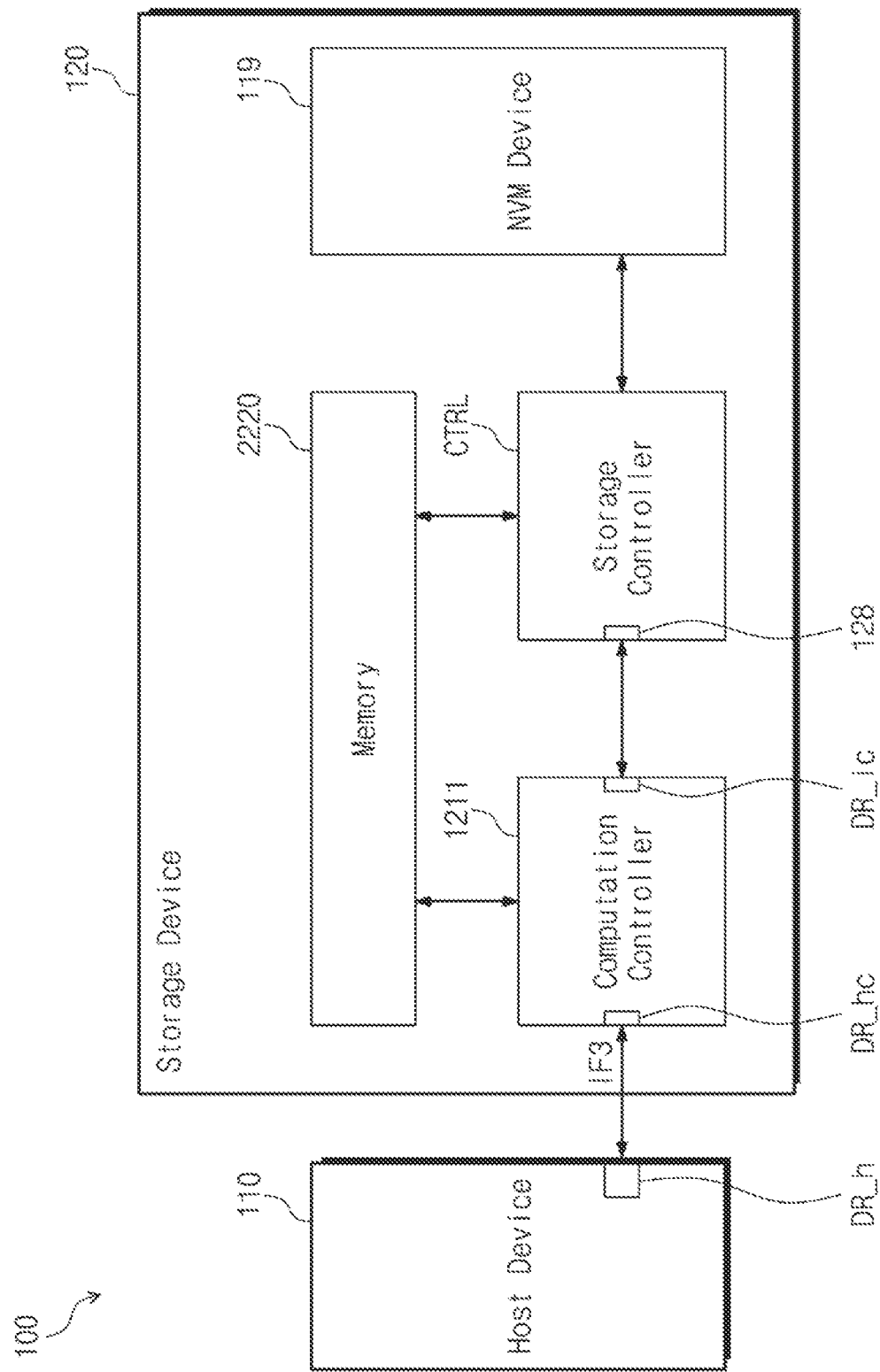

FIG. 18 is a block diagram illustrating a storage system, according to an embodiment. Referring to FIG. 18, a storage device 120, e.g., a computational storage device, may include a computation controller 1211, a storage controller CTRL, a memory 2220, and the NVM device 119. The components of the host device 110 and the storage device 120 are described above, and thus, redundant description will be omitted.

In an embodiment, the computation controller 1211 and the storage controller CTRL may be configured to share the memory 2220. In this case, the computation controller 1211 and the storage controller CTRL may exchange data through the memory 2220. An operation of the storage system 100 is similar to that described above except that the computation controller 1211 and the storage controller CTRL share the memory 2220, and thus, redundant description will be omitted.

Figure 19:
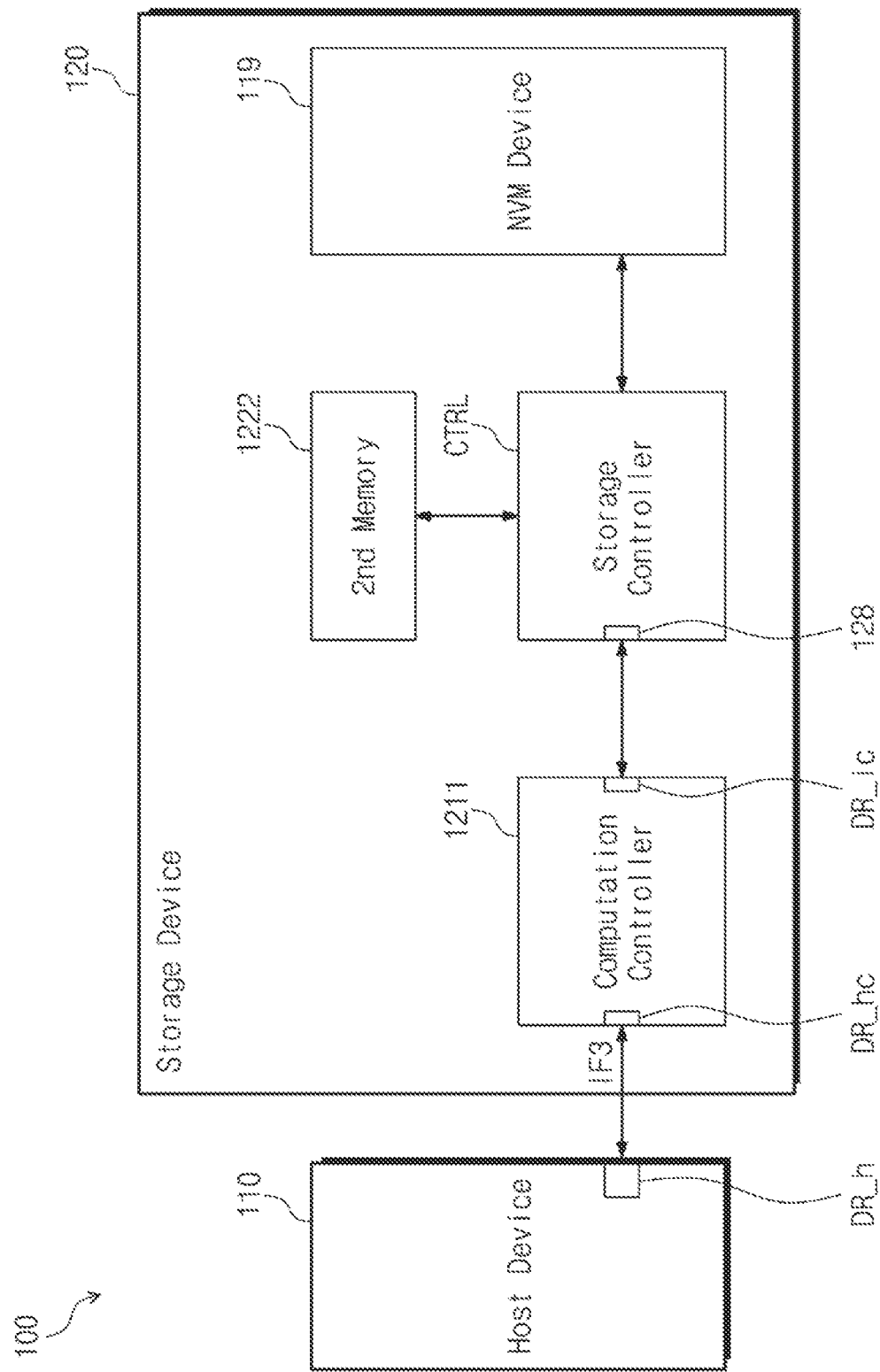

FIG. 19 is a block diagram illustrating a storage system, according to an embodiment. Referring to FIG. 19, a storage device 120, e.g., a computational storage device, may include a computation controller 1211, a storage controller CTRL, a second memory 1222, and the NVM device 119. The components of the host device 110 and the storage device 120 are described above, and thus, redundant description will be omitted.

In an embodiment, the storage controller CTRL may be configured to access the second memory 1222, and the computation controller 1211 may be configured to access the second memory 1222 through the storage controller CTRL. The remaining operations are similar to the operations described above, and thus, redundant description will be omitted.

Figure 20:
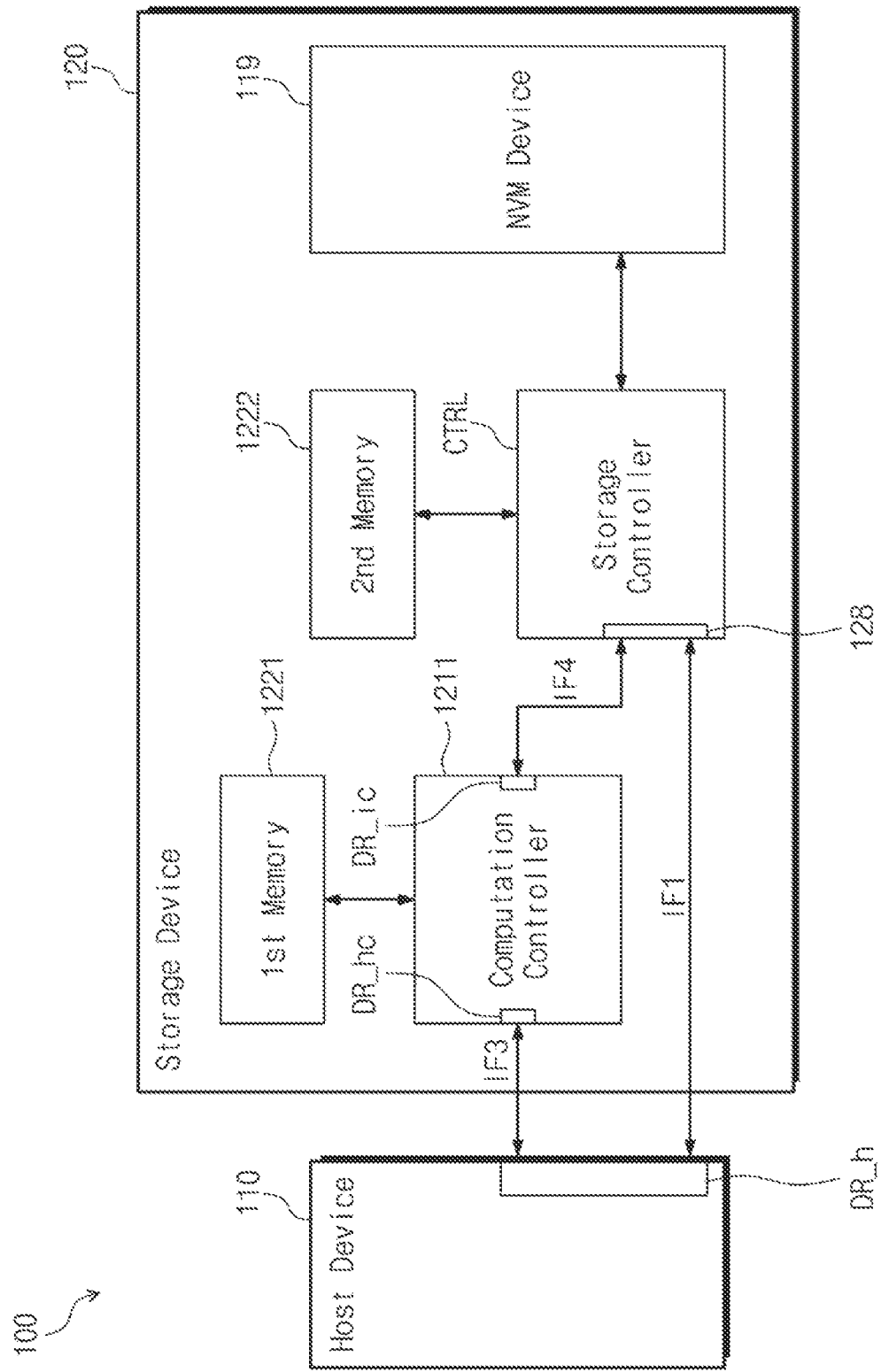

FIG. 20 is a block diagram illustrating a storage system, according to an embodiment. Referring to FIG. 20, a storage device 120, e.g., a computational storage device, may include a computation controller 1211, a storage controller CTRL, a first memory 1221, a second memory 1222, and the NVM device 119. The components of the host device 110 and the storage device 120 are described above, and thus, redundant description will be omitted.

In an embodiment, the host device 110 may individually communicate with the computation controller 1211 and the storage controller CTRL of the storage device 120. For example, the host device 110 may communicate with the storage controller CTRL based on a first interface IF1 and may read data stored in the NVM device 119 or may store data in the NVM device 119.

The host device 110 may communicate with the computation controller 1211 based on a third interface IF3 and may control the computation controller 1211. Under control of the host device 110, the computation controller 1211 may drive an internal application or may send result data according to the driving of the internal application to the host device 110.

In an embodiment, the storage controller CTRL may include an NVMe engine 128b (described in detail above) configured to support communication complying with the NVMe standard. The host device 110 may include a host NVMe driver DR_h, and the host NVMe driver DR_h may communicate with the NVMe engine 128b of the storage controller CTRL. The computation controller 1211 may include an internal NVMe driver DR_ic, and the internal NVMe driver may communicate with the NVMe engine 128b of the storage controller CTRL, e.g., via a fourth interface IF4 based on the NVMe. That is, the host device 110 and the computation controller 1211 may be configured to share the NVMe engine 128b (or a host interface block 128 into which the NVMe engine 128b is included) of the storage controller CTRL. Although the host NVMe driver DR_h is shown as communicating with the computation controller 1211 and the storage controller CTRL, individual drivers may be provided for each of the first interface IF1 and the third interface IF3.

Figure 21:
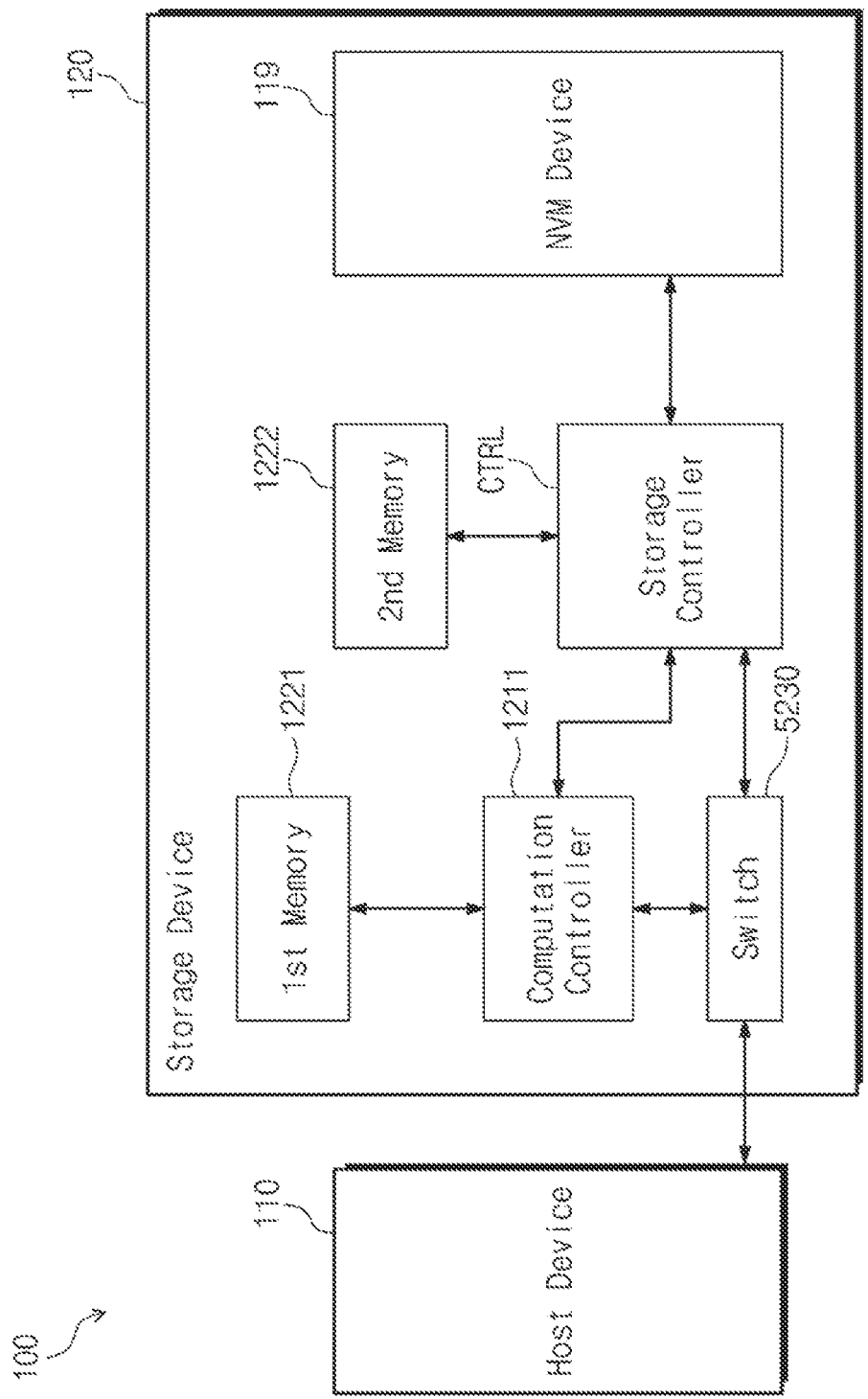

FIG. 21 is a block diagram illustrating a storage system, according to an embodiment. Referring to FIG. 21, a storage device 120, e.g., a computational storage device, may include a computation controller 1211, a storage controller CTRL, a first memory 1221, a second memory 1222, a switch 5230, and the NVM device 119. The components of the host device 110 and the storage device 120 are described above, and thus, redundant description will be omitted.

In an embodiment, the host device 110 may be configured to communicate with the switch 5230 of the storage device 120. The switch 5230 may be configured to provide information (e.g., a command or data) received from the host device 110 to the computation controller 1211 or the storage controller CTRL or to transfer information (e.g., data) received from the computation controller 1211 and the storage controller CTRL to the host device 110. For example, in the case where the information (e.g., a command or data) received from the host device 110 is associated with the computation controller 1211, the switch 5230 may provide the information received from the host device 110 to the computation controller 1211. The computation controller 1211 may perform the corresponding computation (or operation) in response to the received information. In an embodiment, the switch 5230 may be a PCIe switch configured to switch or route PCIe signals.

In an embodiment, the computation (or operation) of the computation controller 1211 may be performed through the storage controller CTRL; in this case, an internal command corresponding to an internal I/O issued from the computation controller 1211 may be processed by an NVMe engine of the storage controller CTRL. In an embodiment, the computation controller 1211 and the storage controller CTRL may communicate with each other through the switch 5230. Alternatively, the computation controller 1211 and the storage controller CTRL may communicate with each other through a separate communication channel, e.g., via a fourth interface IF4.

As described above, a storage device according to embodiments may be a computational storage device configured to internally perform various computations (or operations). The computational storage device may include a computation controller and a storage controller. The computation controller may be configured to perform various computations (or operations) in the computational storage device or may be configured to drive an internal application supporting various computations (or operations). The storage controller may be configured to access a non-volatile memory device included in the computational storage device. In this case, the computation controller and the host device may share a host interface block of the storage controller, and thus, the performance of the computational storage device may be improved without the additional burden on design.

Although an example of the computational storage device which includes two controllers (e.g., the computation controller and the storage controller) is described above with reference to FIGS. 17 to 21, an embodiment is not limited thereto. For example, the computational storage device may include a plurality of computation controllers configured to perform different computation functions and a storage controller configured to access a non-volatile memory device. Alternatively, the computational storage device may include an integrated controller configured to perform various computation functions and an access to the non-volatile memory device. Accordingly, embodiments described above are only examples, and are not limiting.

Figure 22:
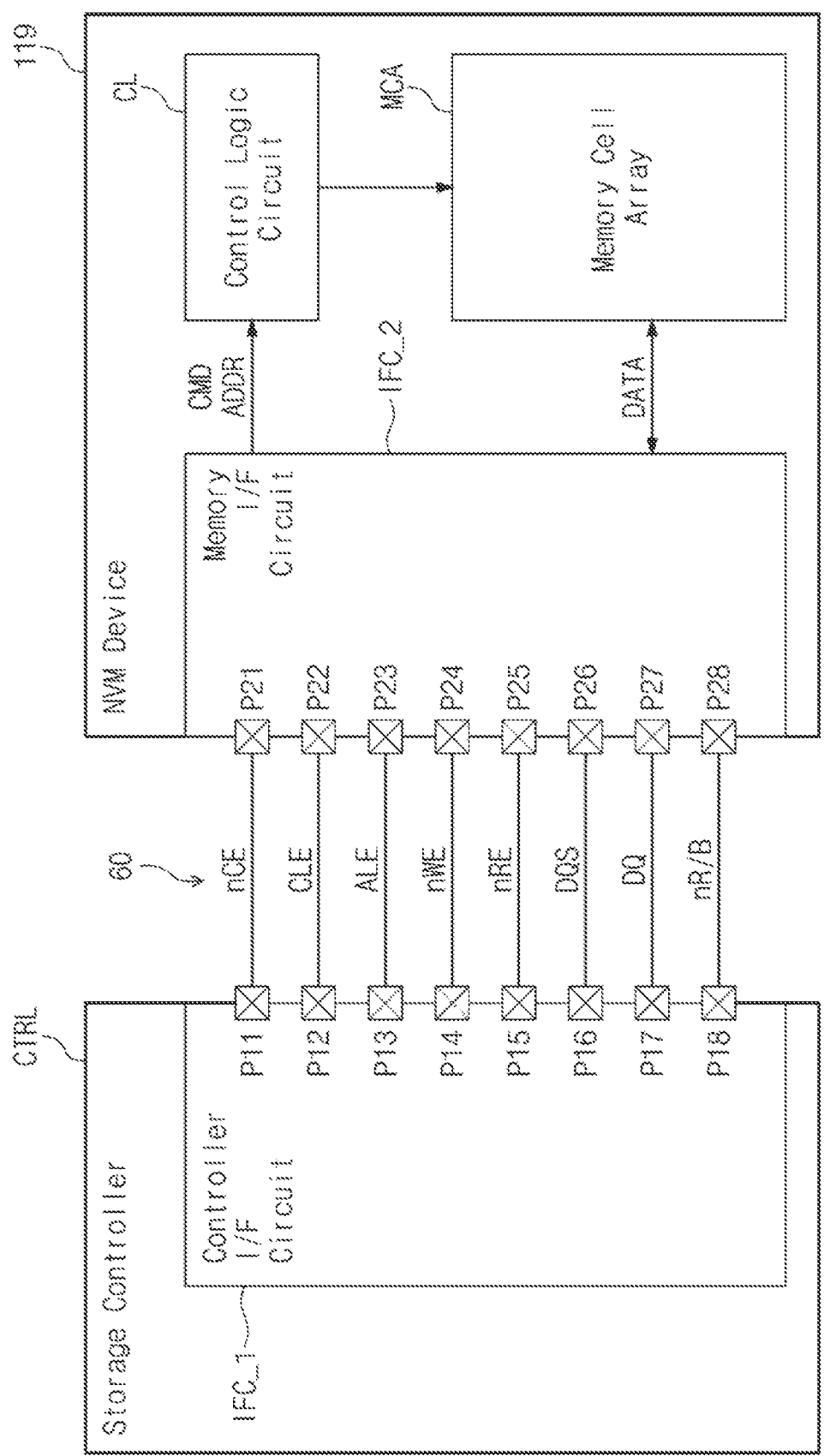
FIG. 22 is a diagram for describing a communication between a storage controller and a non-volatile memory device, according to an embodiment.

FIG. 22 is a diagram for describing a communication between a storage controller CTRL of the storage device 120 and an NVM device 119, according to an embodiment. Referring to FIG. 22, one communication channel 60 between the storage controller CTRL and the NVM device 119 will be described with reference to FIG. 22, but an embodiment is not limited thereto. The storage controller CTRL and other non-volatile memory devices may communicate with each other through other channels (i.e., a plurality of channels) that are substantially similar to the communication channel of FIG. 22.

The storage controller CTRL may include a first interface circuit IFC_1. In an embodiment, the first interface circuit IFC_1 may be a circuit included in the memory interface block 129 described above.

The first interface circuit IFC_1 may include first to eighth pins P11 to P18. The storage controller CTRL may transmit various signals to the NVM device 119 through the plurality of pins P11 to P18. For example, the storage controller CTRL may transmit a chip enable signal nCE through the first pin P11, a command latch enable signal CLE through the second pin P12, an address latch enable signal ALE through the third pin P13, a write enable signal nWE through the fourth pin P14, and a read enable signal nRE through the fifth pin P15 to the NVM device 119, and may exchange a data strobe signal DQS through the sixth pin P16 and a data signal DQ through the seventh pin P17 with the NVM device 119, and receive a read and busy signal nR/B through the eighth pin P18 from the NVM device 119. In an embodiment, the seventh pin P17 may include a plurality of pins.

The NVM device 119 may include a second interface circuit IFC_2, a control logic circuit CL, and a memory cell array MCA. The second interface circuit IFC_2 may include first to eighth pins P21 to P28. The second interface circuit IFC_2 may exchange various signals with the storage controller CTRL through the first to eighth pins P21 to P28. The various signals between the storage controller CTRL and the NVM device 119 are described above, and thus, redundant description will be omitted.

The second interface circuit IFC_2 may obtain the command CMD from the data signal DQ, which is received in an enable section (e.g., a high-level state) of the command latch enable signal CLE based on toggle time points of the write enable signal nWE. The second interface circuit IFC_2 may obtain the address ADDR from the data signal DQ, which is received in an enable section (e.g., a high-level state) of the address latch enable signal ALE based on the toggle time points of the write enable signal nWE.

In an embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the second interface circuit IFC_2 may obtain the command CMD or the address ADDR based on toggle time points of the write enable signal nWE.

In a data (DATA) output operation of the NVM device 119, the second interface circuit IFC_2 may receive the read enable signal nRE, which toggles through the fifth pin P25, before outputting the data DATA. The second interface circuit IFC_2 may generate the data strobe signal DQS, which toggles based on the toggling of the read enable signal nRE. For example, the second interface circuit IFC_2 may generate a data strobe signal DQS, which starts toggling after a predetermined delay (e.g., tDQSRE), based on a toggling start time of the read enable signal nRE. The second interface circuit IFC_2 may transmit the data signal DQ including the data based on a toggle time point of the data strobe signal DQS. Thus, the data may be aligned with the toggle time point of the data strobe signal DQS and transmitted to the storage controller CTRL.

In a data (DATA) input operation of the NVM device 119, when the data signal DQ including the data is received from the storage controller CTRL, the second interface circuit IFC_2 may receive the data strobe signal DQS, which toggles, along with the data from the memory controller. The second interface circuit IFC_2 may obtain the data from the data signal DQ based on toggle time points of the data strobe signal DQS. For example, the second interface circuit IFC_2 may sample the data signal DQ at rising and falling edges of the data strobe signal DQS and obtain the data.

The second interface circuit IFC_2 may transmit a ready/busy output signal nR/B to the storage controller CTRL through the eighth pin P28. When the NVM device 119 is in a busy state (i.e., when operations are being performed in the NVM device 119), the second interface circuit IFC_2 may transmit a ready/busy output signal nR/B indicating the busy state to the storage controller CTRL. When the NVM device 119 is in a ready state (i.e., when operations are not performed or completed in the NVM device 119), the second interface circuit IFC_2 may transmit a ready/busy output signal nR/B indicating the ready state to the storage controller CTRL.

The control logic circuit CL may control all operations of the NVM device 119. The control logic circuit CL may receive the command/address CMD/ADDR obtained from the second interface circuit IFC_2. The control logic circuit CL may generate control signals for controlling other components of the NVM device 119 in response to the received command/address CMD/ADDR. For example, the control logic circuit CL may generate various control signals for programming data to the memory cell array MCA or reading the data from the memory cell array MCA.

The memory cell array MCA may store the data obtained from the second interface circuit IFC_2, via the control of the control logic circuit CL. The memory cell array MCA may output the stored data to the second interface circuit IFC_2 via the control of the control logic circuit CL.

The memory cell array MCA may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM)

cells, or MRAM cells. Hereinafter, an embodiment in which the memory cells are NAND flash memory cells will mainly be described.

Figure 23:
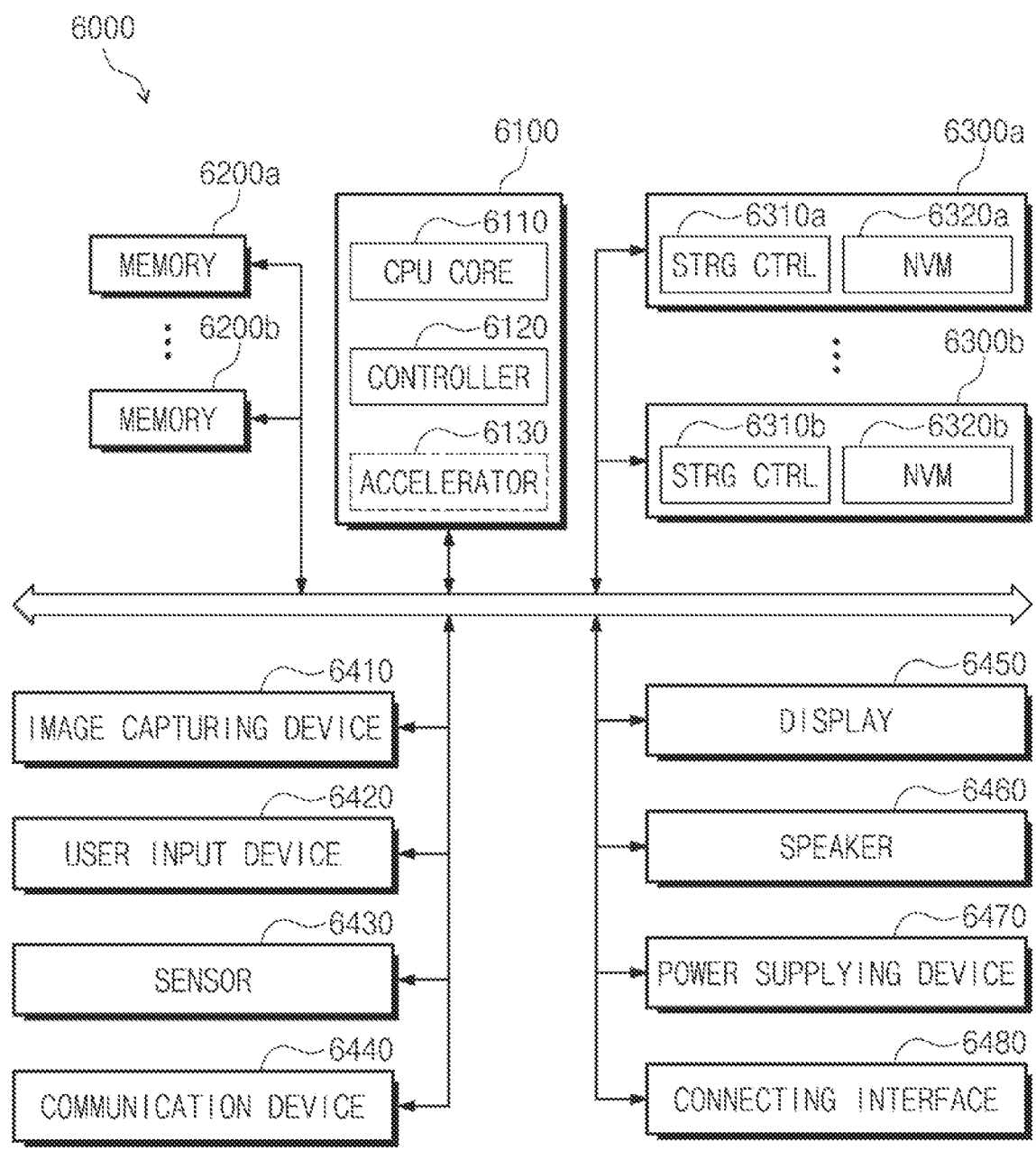
FIG. 23 is a diagram of a system to which a storage device is applied, according to an embodiment.

FIG. 23 is a diagram of a system to which a storage device is applied, according to an embodiment. Referring to FIG. 23, the system 6000 may basically be a mobile system, such as a portable communication terminal (e.g., a mobile phone), a smartphone, a tablet PC, a wearable device, a healthcare device, or an IOT device. However, the system 6000 of FIG. 23 is not necessarily limited to the mobile system and may be a PC, a laptop computer, a server, a media player, or an automotive device (e.g., a navigation device).

The system 6000 may include a main processor 6100, memories (e.g., 6200a to 6200b), and storage devices (e.g., 6300a to 6300b). In addition, the system 6000 may include at least one of an image capturing device 6410, a user input device 6420, a sensor 6430, a communication device 6440, a display 6450, a speaker 6460, a power supplying device 6470, and a connecting interface 6480.

The main processor 6100 may control all operations of the system 6000, more specifically, operations of other components included in the system 6000. The main processor 6100 may be implemented as a general-purpose processor, a dedicated processor, or an application processor.

The main processor 6100 may include at least one CPU core 6110 and further include a controller 6120 configured to control the memories 6200a to 6200b and/or the storage devices 6300a to 6300b. In some embodiments, the main processor 6100 may further include an accelerator 6130, which is a dedicated circuit for a high-speed data operation, such as an artificial intelligence (AI) data operation. The accelerator 6130 may include a graphics processing unit (GPU), a neural processing unit (NPU) and/or a data processing unit (DPU) and be implemented as a chip that is physically separate from the other components of the main processor 6100.

The memories 6200a to 6200b may be used as main memory devices of the system 6000. Although each of the memories 6200a to 6200b may include a volatile memory, such as SRAM and/or DRAM, each of the memories 6200a to 6200b may include non-volatile memory, such as a flash memory, PRAM and/or RRAM. The memories 6200a to 6200b may be implemented in the same package as the main processor 6100.

The storage devices 6300a to 6300b may serve as non-volatile storage devices configured to store data regardless of whether power is supplied thereto, and have larger storage capacity than the memories 6200a to 6200b. The storage devices 6300a to 6300b may respectively include storage controllers 6310a to 6310b, i.e., "STRG CTRL," and NVMs 6320a to 6320b configured to store data via the control of the storage controllers 6310a to 6310b. Although the NVMs 6320a to 6320b may include flash memories having a 2D structure or a 3D V-NAND structure, the NVMs 6320a to 6320b may include other types of NVMs, such as PRAM and/or RRAM.

The storage devices 6300a to 6300b may be physically separated from the main processor 6100 and included in the system 6000 or implemented in the same package as the main processor 6100. In addition, the storage devices 6300a to 6300b may have types of SSDs or memory cards and be removably combined with other components of the system 6000 through an interface, such as the connecting interface 6480 that will be described below. The storage devices 6300a to 6300b may be devices to which a standard protocol, such as a UFS, an eMMC, or an NVMe, is applied, without being limited thereto.

In an embodiment, the storage devices 6300a to 6300b may be configured to perform various computations under the control of the main processor 6100, and one or more of the storage devices 6300a to 6300b may be the same as the storage device 120 described with reference to FIGS. 1 to 21. In an embodiment, the storage devices 6300a to 6300b may be configured to perform or execute at least part of functions executed by the accelerator 6130.

The image capturing device 6410 may capture still images or moving images. The image capturing device 6410 may include a camera, a camcorder, and/or a webcam.

The user input device 6420 may receive various types of data input by a user of the system 6000 and include a touch pad, a keypad, a keyboard, a mouse, and/or a microphone.

The sensor 6430 may detect various types of physical quantities, which may be obtained from the outside of the system 6000, and convert the detected physical quantities into electric signals. The sensor 6430 may include a temperature sensor, a pressure sensor, an illuminance sensor, a position sensor, an acceleration sensor, a biosensor, and/or a gyroscope sensor.

The communication device 6440 may transmit and receive signals between other devices outside the system 6000 according to various communication protocols. The communication device 6440 may include an antenna, a transceiver, and/or a modem.

The display 6450 and the speaker 6460 may serve as output devices configured to respectively output visual information and auditory information to the user of the system 6000.

The power supplying device 6470 may appropriately convert power supplied from a battery embedded in the system 6000 and/or an external power source, and supply the converted power to each of components of the system 6000.

The connecting interface 6480 may provide connection between the system 6000 and an external device, which is connected to the system 6000 and capable of transmitting and receiving data to and from the system 6000. The connecting interface 6480 may be implemented by using various interface schemes, such as ATA, SATA, e-SATA, SCSI, SAS, PCI, PCIe, NVMe, IEEE 6394, a USB interface, an SD card interface, an MMC interface, an eMMC interface, a UFS interface, an eUFS interface, and a CF card interface.

Figure 24:
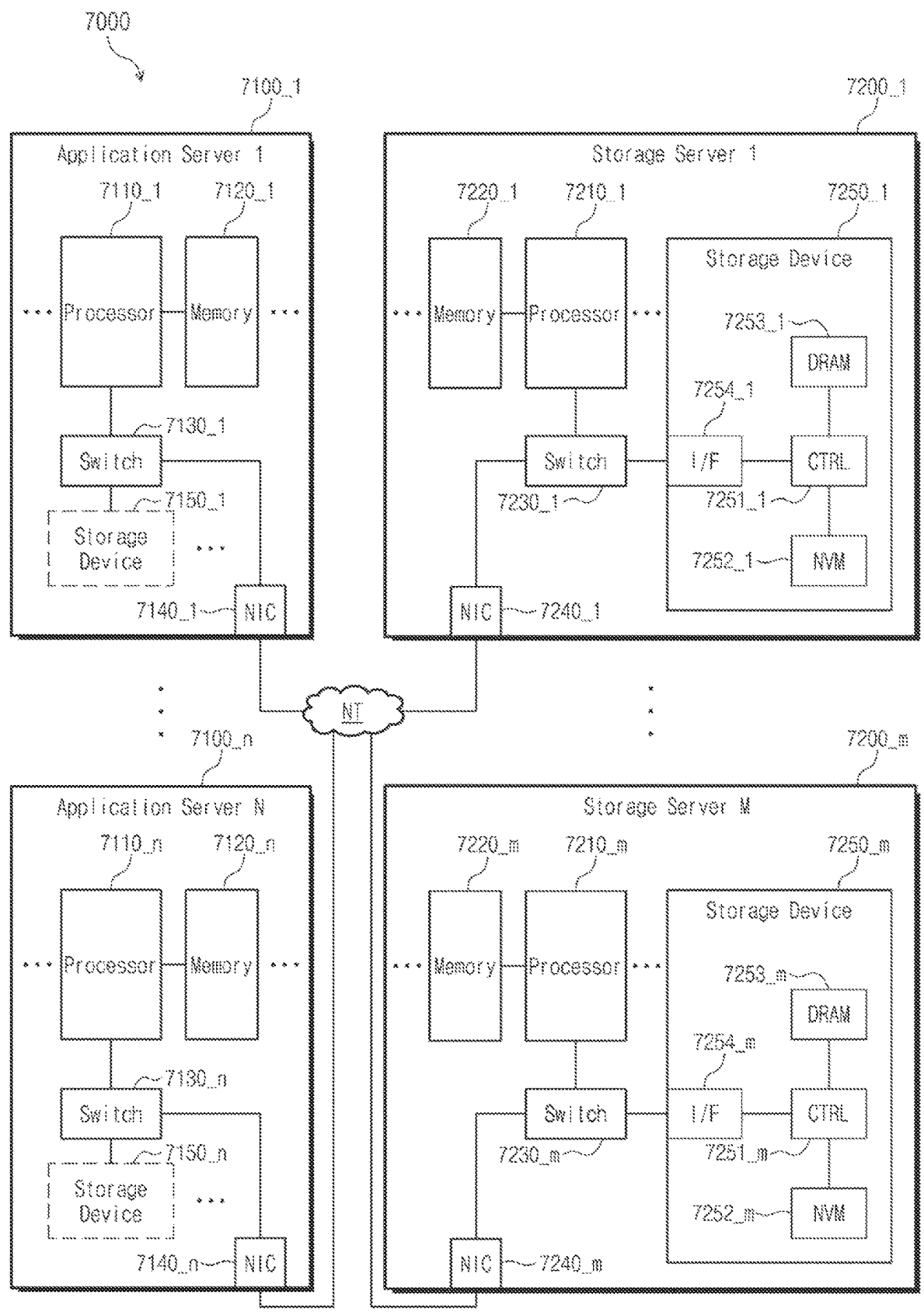
FIG. 24 is a diagram of a data center to which a memory device is applied, according to an embodiment.

FIG. 24 is a block diagram illustrating a data center to which a server system according to an embodiment is applied. Referring to FIG. 24, a data center 7000 that is a facility maintaining a variety of data and providing various services associated with data may be called a "data storage center". The data center 7000 may be a system for a search engine or database management or may be a computing system used in various institutions. The data center 7000 may include a plurality of application servers 7100_1 to 7100_n and a plurality of storage servers 7200_1 to 7200_m. The number of application servers 7100_1 to 7100_n and the number of storage servers 7200_1 to 7200_m may be variously changed or modified. A plurality of application servers 7100_1 to 7100_n may respectively include processors 7110_1 to 7110_n, switches 7130_1 to 7130_n, storage devices 7150_1 to 7150_n, and network interface connectors (NICs) 7140_1 to 7140_n for connecting to the network NT. A plurality of storage servers 7200_1 to 7200_m may respectively include processors 7210_1 to 7210_m, memories 7220_1 to 7220_m, storage devices 7250_1 to 7250_m, switches 7230_1 to 7230_m, and NICs 7240_1 to 7240_m. The storage devices 7250_1 to 7250_m may respectively include controllers 7251_1 to 7251_m (indicated as "CTRL"

in FIG. 23), NVMs 7252_1 to 7252_m, DRAMs 7253_1 to 7253_m, and interfaces (I/F) 7254_1 to 7254_m.

Below, for convenience of description, an example of the first storage server 7200_1 will be described. However, each of the storage servers 7200_1 to 7200_m and the plurality of application servers 7100_1 to 7100_n may have a similar structure.

The first storage server 7200_1 may include a processor 7210_1, a memory 7220_1, a switch 7230_1, an NIC 7240_1, and a storage device 7250_1. The processor 7210_1 may perform overall operations of the first storage server 7200_1. The memory 7220_1 may store various instructions or data under control of the processor 7210_1. The processor 7210_1 may be configured to access the memory 7220_1 to execute various instructions or to process data. In an embodiment, the memory 7220_1 may include at least one of various kinds of memory devices such as a Double Data Rate Synchronous DRAM (DDR SDRAM), a High Bandwidth Memory (HBM), a Hybrid Memory Cube (HMC), a Dual In-line Memory Module (DIMM), an Optane DIMM, and a Non-Volatile DIMM (NVDIMM).

In an embodiment, the number of processors 7210_1 included in the first storage server 7200_1 and the number of memories 7220_1 included in the first storage server 7200_1 may be variously changed or modified. In an embodiment, the processor 7210_1 and the memory 7220_1 included in the first storage server 7200_1 may constitute a processor-memory pair, and the number of processor-memory pairs included in the first storage server 7200_1 may be variously changed or modified. In an embodiment, the number of processors 7210_1 included in the first storage server 7200_1 and the number of memories 7220_1 included in the first storage server 7200_1 may be different. The processor 7210_1 may include a single core processor or a multi-core processor.

Under control of the processor 7210_1, the switch 7230_1 may selectively connect the processor 7210_1 and the storage device 7250_1 or may selectively connect the NIC 7240_1, the storage device 7250_1, and the processor 7210_1.

The NIC 7240_1 may connect the first storage server 7200_1 with the network NT. The NIC 7240_1 may include a network interface card, a network adapter, and the like. The NIC 7240_1 may be connected with the network NT through a wired interface, a wireless interface, a Bluetooth interface, or an optical interface. The NIC 7240_1 may include an internal memory, a DSP, a host bus interface, and the like and may be connected with the processor 7210_1 or the switch 7230_1 through the host bus interface. The host bus interface may include at least one of various interfaces such as an ATA interface, a SATA interface, an e-SATA interface, an SCSI, a SAS interface, a PCI interface, a PCIe interface, an NVMe interface, an IEEE 1394 interface, a USB interface, an SD card interface, an MMC interface, an eMMC interface, a UFS interface, an eUFS interface, and a CF card interface. In an embodiment, the NIC 7240_1 may be integrated with at least one of the processor 7210_1, the switch 7230_1, and the storage device 7250_1.

Under control of the processor 7210_1, the storage device 7250_1 may store data or may output the stored data. The storage device 7250_1 may include a controller 7251_1, an NVM 7252_1, a DRAM 7253_1, and an I/F 7254_1. In an embodiment, the storage device 7250_1 may further include a secure element (SE) for security or privacy.

The controller 7251_1 may control overall operations of the storage device 7250_1. In an embodiment, the controller 7251_1 may include an SRAM. In response to signals received through the I/F 7254_1, the controller 7251_1 may store data in the NVM 7252_1 or may output data stored in the NVM 7252_1. In an embodiment, the controller 7251_1 may be configured to control the NVM 7252_1 based on a toggle interface or an ONFI.

The DRAM 7253_1 may be configured to temporarily store data to be stored in the NVM 7252_1 or data read from the NVM 7252_1. The DRAM 7253_1 may be configured to store various data (e.g., metadata and mapping data) for the controller 7251_1 to operate. The I/F 7254_1 may provide a physical connection between the controller 7251_1 and the processor 7210_1, the switch 7230_1, or the NIC 7240_1. In an embodiment, the interface may be implemented to support a Direct-Attached Storage (DAS) that allows the direct connection of the storage device 7250_1 through a dedicated cable. In an embodiment, the I/F 7254_1 may be implemented based on at least one of various above-described interfaces through a host interface bus.

The above components of the first storage server 7200_1 are provided as an example, and are not limiting. The above components of the first storage server 7200_1 may be applied to each of the storage servers or each of the plurality of application servers 7100_1 to 7100_n. In an embodiment, each of storage devices 7150_1 to 7150_n of the application servers 7100_1 to 7100_n may be selectively omitted.

The plurality of application servers 7100_1 to 7100_n and the plurality of storage servers 7200_1 to 7200_m may communicate with each other over the network NT. The network NT may be implemented by using a Fibre channel (FC), an Ethernet, or the like. In this case, the FC may be a medium that is used in high-speed data transmission and may use an optical switch providing high performance/high availability. Depending on an access manner of the network NT, the storage servers 7200_1 to 7200_m may be provided as file storage, block storage, or object storage.

In an embodiment, the network NT may be a storage dedicated network such as a storage area network (SAN). For example, the SAN may be an FC-SAN that uses an FC network and is implemented in compliance with an FC protocol (FCP). Alternatively, the SAN may be an IP-SAN that uses a TCP/IP network and is implemented in compliance with an iSCSI (or SCSI over TCP/IP or an Internet SCSI) protocol. In an embodiment, the network NT may be a related art network such as a TCP/IP network. For example, the network NT may be implemented in compliance with a protocol such as FC over Ethernet (FCoE), Network Attached Storage (NAS), or NVMe over Fabrics (NVMe-oF).

In an embodiment, at least one of the plurality of application servers 7100_1 to 7100_n may be configured to access at least one of the remaining application servers or at least one of the plurality of storage servers 7200_1 to 7200_m over the network NT.

For example, the first application server 7100_1 may store data requested by a user or a client in at least one of the plurality of storage servers 7200_1 to 7200_m over the network NT. Alternatively, the first application server 7100_1 may obtain data requested by the user or the client from at least one of the plurality of storage servers 7200_1 to 7200_m over the network NT. In this case, the first application server 7100_1 may be implemented as a web server, a database management system (DBMS), or the like.

That is, a processor 7110_1 of the first application server 7100_1 may access a memory (e.g., 7120_n) or a storage device (e.g., 7150_n) of another application server (e.g., 7100_n) over the network NT. Alternatively, the processor 7110_1 of the first application server 7100_1 may access the memory 7220_1 or the storage device 7250_1 of the first storage server 7200_1 over the network NT. As such, the first application server 7100_1 may perform various operations on data stored in other application servers or the plurality of storage servers 7200_1 to 7200_m. For example, the first application server 7100_1 may execute or issue an instruction for moving or copying data between the other application servers or between the plurality of storage servers 7200_1 to 7200_m. In this case, data targeted for movement or copy may be moved from the storage devices 7250_1 to 2250_m of the storage servers 7200_1 to 7200_m to the memories 7120_1 to 7120_n of the application servers 7100_1 to 7100_n through the memories 7220_1 to 7220_m of the storage servers 7200_1 to 7200_m or directly. Data transferred over the network NT may be data that are encrypted for security or privacy.

In an embodiment, one or more of the storage devices 7150_1 to 7150_n and 7250_1 to 7250_m may be computational storage devices described with reference to FIGS. 1 to 21 and may be configured to perform various computation/calculation operations. The storage devices 7150_1 to 7150_n and 7250_1 to 7250_m may process an internal I/O requested while performing various internal computations/calculations, as described with reference to FIGS. 1 to 21.

According to some embodiments, a storage device may perform various computations (or operations) by executing an internal application. In this case, an internal I/O generated in the storage device may be processed through the same path as a host I/O generated by an external host device. Accordingly, the burden of designing a separate dedicated driver or dedicated channel for processing of the internal application may be alleviated. Also, because the design of an existing optimized storage device may be used, the performance of the storage device is improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A computational storage device comprising:
   a non-volatile memory (NVM) device; and
   a storage controller configured to control the NVM device,
   wherein the storage controller includes:
   a computation processor configured to execute an internal application to generate an internal command;
   a host interface circuit configured to communicate with the computation processor through an NVM express (NVMe) interface virtualized on a system bus, to receive a host command from an external host device, to receive the internal command from the computation processor via the NVMe interface, and to individually process the received host command and the received internal command;
   a flash translation layer (FTL) configured to perform a first address mapping operation based on a result of the processing by the host interface circuit of the received host command, and to perform a second address mapping operation based on a result of the processing by the host interface circuit of the received internal command; and
   a memory interface circuit configured to control the NVM device based on the first address mapping operation and the section address mapping operation of the FTL.

2. The computational storage device of claim 1, wherein the computation processor, the host interface circuit, the FTL, and the memory interface circuit communicate with each other through the system bus.

3. The computational storage device of claim 2, wherein the host interface circuit is configured to communicate with the external host device through a first interface.

4. The computational storage device of claim 3, wherein the first interface is an NVM express (NVMe) interface.

5. The computational storage device of claim 2, wherein the host interface circuit includes:
   a physical port configured to transmit and receive a physical signal to and from the external host device, respectively; and
   an NVMe processor configured to receive the host command through the physical port and to receive the internal command through the system bus.

6. The computational storage device of claim 5, wherein the NVM device is divided into a first namespace and a second namespace, and
   wherein the NVMe processor is further configured to process the host command with respect to the first namespace and to process the internal command with respect to the second namespace.

7. The computational storage device of claim 2, wherein the host interface circuit includes:
   a physical port configured to transmit and receive a physical signal to and from the external host device, respectively;
   a first NVMe processor configured to receive the host command through the physical port; and
   a second NVMe processor configured to receive the internal command through the system bus.

8. The computational storage device of claim 7, wherein the NVM device is divided into a first namespace, a second namespace, and a third namespace,
   wherein the first NVMe processor is further configured to process the host command with respect to the first namespace,
   wherein the second NVMe processor is further configured to process the internal command with respect to the second namespace, and
   wherein the first NVMe processor and the second NVMe processor share the third namespace.

9. The computational storage device of claim 1, wherein the storage controller further includes a controller memory,
   wherein the controller memory includes an internal submission queue and an internal completion queue that correspond to the internal command.

10. The computational storage device of claim 9, wherein the computation processor is further configured to add the internal command to the internal submission queue of the controller memory through the host interface circuit, and
    wherein the host interface circuit receives the internal command from the internal submission queue of the controller memory.

11. The computational storage device of claim 9, wherein the computation processor is further configured to directly add the internal command to the internal submission queue of the controller memory, and
    wherein the host interface circuit is further configured to receive doorbell signaling from the computation processor and receive the internal command by fetching the internal command from the internal submission queue of the controller memory in response to the doorbell signaling.

12. The computational storage device of claim 1, wherein the host interface circuit is further configured to:
receive doorbell signaling from the external host device; and
receive the host command by fetching the host command from a host submission queue of a host memory of the external host device in response to the doorbell signaling.

13. The computational storage device of claim 1, wherein the FTL includes:
an FTL accelerator configured to perform the first address mapping operation and the second address mapping operation;
a read buffer circuit configured to manage read data received through the memory interface circuit; and
a write buffer circuit configured to manage write data received through the host interface circuit, and
wherein the FTL accelerator, the read buffer circuit, and the write buffer circuit are hardware circuits.

14. An operational method of a computational storage device, the operational method comprising:
receiving, by a physical port, a host command from an external host device;
processing the host command through a non-volatile memory express (NVMe) processor;
performing, by a flash translation layer (FTL), first address mapping for the processed host command;
accessing, by a memory interface circuit, an NVM device based on the first address mapping;
generating, by a computation processor executing an internal application, an internal command;
processing the internal command through the NVMe processor;
performing, by the FTL, second address mapping for the processed internal command; and
accessing, by the memory interface circuit, the NVM device based on the second address mapping.

15. The operational method of claim 14, wherein the generating the internal command by the computation processor further includes:
receiving, by the physical port, an execute command from the external host device;
transferring, by the physical port, the execute command to the computation processor; and
executing, by the computation processor, the internal application in response to the execute command and generating the internal command based on the executing the internal application.

16. The operational method of claim 14, wherein the generating the internal command by the computation processor further includes:
receiving, by the physical port, an execute command from the external host device;
receiving, by the NVMe processor, the execute command from the physical port;
transferring, by the NVMe processor, the execute command to the computation processor; and
executing, by the computation processor, the internal application in response to the execute command and generating the internal command depending on the executing the internal application.

17. The operational method of claim 14, wherein the internal application is stored in a controller memory of the computational storage device.

18. A storage controller configured to control a non-volatile memory (NVM) device comprising:
an NVM express (NVMe) processor configured to receive a host command through an external host driver;
a flash translation layer (FTL) configured to perform address mapping under control of the NVMe processor;
a memory interface circuit configured to access the NVM device based on the address mapping of the FTL;
an internal application configured to issue an internal input/output (I/O) request;
an internal file system configured to organize the internal I/O request; and
an internal driver configured to generate an internal command based on the organized internal I/O request,
wherein the NVMe processor is further configured to:
receive the internal command from the internal driver; and
access the NVM device through the FTL and the memory interface circuit based on the received internal command.

19. The storage controller of claim 18, wherein the external host driver and the NVMe processor are configured to communicate with each other through an NVMe interface, and
wherein the internal driver and the NVMe processor are configured to communicate with each other through an interface corresponding to a virtualized version of the NVMe interface.

20. The storage controller of claim 19, wherein each of the external host driver and the internal driver includes an NVMe driver configured to support the NVMe interface.

* * * * *